(12) United States Patent
Kashima

(10) Patent No.: US 7,647,619 B2
(45) Date of Patent: Jan. 12, 2010

(54) SCALABLE FILTERING TABLE

(75) Inventor: Koji Kashima, Sunnyvale, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1697 days.

(21) Appl. No.: 09/935,419

(22) Filed: Aug. 22, 2001

(65) Prior Publication Data

US 2002/0087999 A1 Jul. 4, 2002

Related U.S. Application Data

(63) Continuation-in-part of application No. 09/558,787, filed on Apr. 26, 2000.

(51) Int. Cl.
*H04N 7/16* (2006.01)

(52) U.S. Cl. ............... 725/146; 725/100; 725/116; 725/130; 370/392

(58) Field of Classification Search ............ 725/87, 725/89, 100, 131, 116, 146; 375/240.23; 370/392

See application file for complete search history.

(56) References Cited

U.S. PATENT DOCUMENTS

| | | | | |
|---|---|---|---|---|
| 5,684,791 | A * | 11/1997 | Raychaudhuri et al. | 370/310.2 |
| 5,959,659 | A * | 9/1999 | Dokic | 725/152 |
| 6,016,348 | A * | 1/2000 | Blatter et al. | 380/228 |
| 6,222,841 | B1 * | 4/2001 | Taniguchi | 370/389 |
| 6,434,170 | B1 * | 8/2002 | Movshovich et al. | 370/536 |
| 6,483,543 | B1 * | 11/2002 | Zhang et al. | 348/390.1 |
| 6,538,999 | B1 * | 3/2003 | Sato | 370/252 |
| 6,578,080 | B1 * | 6/2003 | Dwork | 709/229 |
| 6,778,610 | B2 | 8/2004 | Lin | 375/240.27 |
| 6,963,613 | B2 | 11/2005 | MacInnis et al. | 375/240.25 |
| 2001/0024456 | A1 * | 9/2001 | Zaun et al. | 370/535 |
| 2001/0043690 | A1 * | 11/2001 | Bakshi et al. | 379/133 |
| 2002/0001310 | A1 * | 1/2002 | Mai et al. | 370/390 |
| 2002/0010679 | A1 * | 1/2002 | Felsher | 705/51 |
| 2002/0184649 | A1 * | 12/2002 | Wilson | 725/114 |
| 2002/1018464 | * | 12/2002 | Wilson | 725/114 |
| 2005/0283819 | A1 * | 12/2005 | Shimoji et al. | 725/142 |

OTHER PUBLICATIONS

John Watkins, "MPEG-2" Chapter 1, "Introduction to Compression," pp. 1-10.

John Watkins, "MPEG-2" Chapter 6, "Program and Transport Streams" 222-232.

(Continued)

*Primary Examiner*—Christopher Kelley
*Assistant Examiner*—Sahar A Baig
(74) *Attorney, Agent, or Firm*—Haverstock & Owens LLP

(57) ABSTRACT

A broadcast receiver includes an input unit, a receiving unit, a control unit, a main memory, a demultiplexer unit, and a decoding unit. A transport stream of digital packetized data includes various data types identified by various parameters within the packet header. A filtering table lists select identifying parameters representing the various data types which are to be stored and processed. Data packets which do not have a select parameter found within the filtering table are ignored by the broadcast receiver. The filtering table is scalable by a control unit to an optimum size, which is the minimum size necessary to store all necessary parameters. A control unit determines the number of parameters required in the filtering table, and scales the filtering table to accommodate that number of parameters.

39 Claims, 20 Drawing Sheets

OTHER PUBLICATIONS

Michael Robin, "MPEG coding System", Broadcast Engineering, Aug. 1999, pp. 1-6.

"Network Provisioning for MPEG-2 Bandwidth", Cisco Systems, Inc., 1992-2001, pp. 1-5.

"Section 7: Transport Streams", Tektronix MBD: Applications, http://www.tektronix.com/Measurement/App_Notes/mpegfund/sect7.html May 16, 2001, pp. 1-5.

Steffen Lindner, "Clocks and Timestamps", PixStream Incorporated, http://www.pixstream.com/education/Papers/Clocks_stamps.htm , May 18, 2001, pp. 1-2.

"MPEG-2 Program Specific Information (PSI Tables)".

"Measurement on MPEG2 and DVB-T Signals (1)".

"Transport Stream Analysis" Adherent, http://www.adherent.com/focus/focus_tsa.htm May 16, 2001, pp. 1-3.

Raj Jain, "Audiovisual Multimeda Services (AMS)", Professor of Computer and Information Science, http://www.cis.ohio-state.edu/~jain/, p. 1.

"Digital Video Broadcasting", http://home.mira.net/~marcop/digital.htm, May 16, 2001, pp. 1-7.

Paul Freeman, "Implementing the ATSC PSIP Standard" SoftProse, Inc., (www.softproseinc.com/, pp. 1-34.

"MPEG Program Specific Information (PSI)" http://www.zenith.com/mpeg_tutorial/mpegpsi.HTM, May 16, 2001, p. 1-1.

"PCR-Program Clock Reference", http://www.zenith.com/mpeg_tutorial/PCR.HTM, May 18, 2001, p. 1-1.

"PES Packets and Elementary Streams", http://www.zenith.com/mpeg_tutorial/pespckt.HTM, May 17, 2001, pp. 1-2.

"Premilinary—Specification of TS-DMUX module" Hirotech, Inc., Apr. 30, 1998, pp. 2-29.

"PAT and PMT", http://www.sarnoff.com/tech_realworld/broadcast/psip/ATSC_PSIP/tsld039.htm, May 16, 2001, pp. 1-2.

Ghyslain Pelletier, "An Overview of the MPEG-2 Transport Stream in Digital Video Broadcasting", Computer Science Department, University of Lulea, Pelletier, Sweden, {pelle@cdt.luth.se}, 3 pgs.

Raj Jain, "MPEG-2 Clock Synchronization" The Ohio State University, pp. 11-12.

Michael Isnardi, "DTV Multicasting", http://www.broadcastengineering.com/archives/0998/199809be41.html, May 17, 2001, pp. 1-5.

"MPEG-2 Transmission", http://www.erg.abdn.ac.uk/public_html/research/future-net/digital-video/mpeg2-trans.html, May 16, 2001, pp. 1-10.

"Information Technology—Generic Coding of Moving Pictures and Associated Audio Information: Systems", International Standard, ISO/IEC 13818-1, Second Edition Dec. 1, 2000, 172 pgs.

* cited by examiner

Fig. 19A Filtering Table with Scalable Number of Registers

Columns: 15 14 13 12 11 10 9 8 7 6 5 4 3 2 1 0

Rows:
- Program Association Table ~1902
- Program Map Table 1 ~1904
- VIDEO 1 ~1906
- AUDIO 1 ~1908
- SYSTEM 1 ~1910

Fig. 19B

Columns: 15 14 13 12 11 10 9 8 7 6 5 4 3 2 1 0

Rows:
- Program Association Table ~1902
- Program Map Table ~1904
- VIDEO 1 ~1906
- AUDIO 1 ~1908
- SYSTEM 1 ~1910
- Program Map Table 2 ~1912
- VIDEO 2 ~1914
- AUDIO 2A ~1916
- AUDIO 2B ~1918
- AUDIO 2C ~1920
- AUDIO 2D ~1922
- ENGLISH SUBTITLE ~2024

SCALABLE FILTERING TABLE

RELATED APPLICATIONS

This application is a continuation-in-part of co-pending application Ser. No. 09/558,787 entitled BROADCAST RECEIVER, CONTROL METHOD THEREFOR, AND PROGRAM, which was filed on Apr. 26, 2000. The co-pending application Ser. No. 09/558,787, CONTROL METHOD THEREFOR, AND PROGRAM, filed on Apr. 26, 2000, is hereby incorporated by reference.

FIELD OF THE INVENTION

The present invention relates to the architecture of storage registers and buffers within broadcast receivers or settop boxes which receive transport streams of digital data. More particularly, the present invention relates to a scalable architecture for use in storage registers such as a filtering table used in a broadcast receiver.

BACKGROUND OF THE INVENTION

In current settop boxes (STBs,) and broadcast receivers, processing that separates multiplexed transport stream data into various types of data (such as video data and audio data) is performed by hardware. Accordingly, the FIFO buffer (fixed to a size determined by the maximum bit rate of input transport stream data), required to temporarily store input transport stream data, is realized as part of the hardware.

The bit rate of the input transport stream data differs depending on the country, the broadcaster, etc. Accordingly, after using the hardware to determine the design, as described above, when an STB for another destination or another broadcaster is developed, a problem arises in that since the bit rates of the input transport stream data differ, the hardware design must be substantially modified to achieve optimal size (area) so as to prevent the input transport stream data from overflowing.

In digital broadcast receiving devices such as settop boxes ("STBs"), etc., a multiplexed transport stream of digital data is received for processing. An overview of standards for digital transmission is seen in the International Standard ISO/IEC 13818-1 "Information Technology—Generic coding of moving pictures and associated audio information: Systems," (hereinafter "MPEG 2") which is herein incorporated by reference. Although the discussion of prior art is directed to the transport stream architecture used in MPEG 2 for exemplary purposes, it is understood that the invention disclosed herein may be used in conjunction with any packetized digital stream of data.

Within MPEG 2 transmission, digital data, such as the video portion of a movie, is originally packetized into PES Packets which together form the packetized elementary stream ("PES"). PES packets are variable in length, including a 6 byte protocol header and an optional protocol header. Because of a variety of technical limitations, from synchronization, jitter control, and error management, packets of this length are not well suited for point-to-point broadcasts in a broadcast media. Within MPEG 2 therefore, separate standards exist for "lossless" environments, such as a DVD movie being shown at home, and "lossy" environments, such as point-to-point digital broadcasts. The preferred approach for a "lossless" medium is a "program stream" and the preferred standard for a "lossy" medium is a transport stream (TS). Within a Transport stream, each PES packet is further divided up into standardized transport stream packets ("TSP"s) which are defined by a fixed length of 188 bytes. FIG. 1 shows digital audio information 100 being packetized into a set of variable length PES packets 102-110. Further packetization is illustrated using PES audio packet C 106, which is seen to be further packetized into multiple fixed length transport stream packets 120-126. As noted, the MPEG 2 standard has fixed these packets to a length of exactly 188 bytes. FIG. 2 illustrates digital video information 200 being packetized into variable length PES packets 202-210. PES video packet C 206 is seen to be further packetized into multiple fixed length transport stream Packets 220-228.

FIG. 3 illustrates how a PES packet is broken up and stored in a series of transport stream packets. A simplified PES packet 300 is shown comprising a header 302 and a data payload 304. Although a PES packet is a continuous stream of data, the payload 304 is broken up into imaginary partitions 306-312 for illustrative purposes, delineated by dotted lines. The PES packet is sent in a series of transport stream packets 320, 322, 324 and 326. Each of the transport steam packets 320-326 include a header and a data payload. When broken up and stored in a series of transport stream packets 320-326, the PES header 302 is stored in the first portion of the payload 340 of the first transport stream packet 320. The remaining area of the payload 340 of the first transport stream packet 320 is filled with data 306 from the PES packet payload 304. The next data 308 from the PES packet payload 304 is stored in the payload 342 of the second transport stream packet 322. The next data 310 from the PES packet payload 304 is stored in the payload 344 of the third transport stream packet 324. The process continues through to the last data 312 in the PES packet payload 304 which is stored in the payload 346 of the last transport stream packet 326 formed from that PES packet 300. Because all transport stream packets must be 188 bytes in length, if the last remaining data 312 from the PES payload 304 is not large enough to fill the payload 346 of the final transport stream packet 326, the unused portion of the final payload 346 is filled with stuffing bytes 0xFF (all ones).

FIG. 4 is a more detailed representation of a PES Packet as seen in FIGS. 1 (102-110), FIG. 2 (202-210) and FIG. 3 (300). According to FIG. 4, a PES Packet 400 comprises a six-byte header 402, an optional PES header 404 ranging from three to two-hundred fifty-nine bytes, and a payload 406 of up to 65,526 bytes. The PES packet header 402 itself comprises a three-byte start code prefix 410, a one-byte Stream ID 412, and a two-byte PES packet length indicator 414. Some well known Stream IDs 412 include:

1. 110x xxxx—MPEG-2 audio stream number x xxxx.
2. 1110 yyyy—MPEG-2 video stream number yyyy; and
3. 1111 0010—MPEG 2 DSC-CC control packets.

The PES optional header 404 includes a two bit PES_Scrambling_Control 422 which defines whether scrambling is used and the chosen scrambling method, a 1 bit $PES_{13}$ Priority indicator 424 which indicates the priority of the current PES packet 400, a one-bit data alignment indicator 426 for indicating if the payload 406 starts with a video or audio start code, a one-bit copyright indicator 428 showing if the information contained within the payload is copyright protected, a one-bit original-or-copy indicator 430 showing if this is a copy or an original elementary stream. The one-byte flag field 432 indicates whether certain other optional fields exist in the optional field 436 area. These flags 432 (and their corresponding optional data fields if they exist) include a "presentation time stamp" ("PTS"), and a "decode time stamp ("DTS") flag 440. The decode time stamp is necessary because video pictures may arrive at the decoder in a different order than they will be presented. Accordingly, it is possible that a picture will have to be decoded some time before it is presented for viewing in order to allow the decoded portion to act as a reference for a B picture. The DTS therefore indicates the time wherein the packet must be decoded. The PTS indicates the time when the picture must be presented. As discussed in conjunction with FIGS. 6 and 7, the PTS and DTS time stamps are encoded by the encoder's clock. The decoder clock must therefore reference itself to these time stamps. These presentation time stamps and decode time stamps which are introduced at the PES level should not be confused with the program clock reference (PCR) 516 (FIG. 5) which is stored in the adaptation field 514 of a transport stream packet 504, and also explained further in conjunction with FIG. 7.

Returning to the PES packet, an ESCR flag 442 indicates the presence of an elementary stream clock reference in the optional field 436. An elementary stream rate flag 444, if on, signals an optional field with information on the rate at which the elementary stream was encoded. The trick mode flag 446 indicates that the audio or video is not the normal elementary stream. This might occur, for example, after DSM-CC has signaled a replay. Following the additional copy info flag 448, the PES CRC flag 450 indicates the presence of a cyclical redundancy checksum within the optional field 436 to facilitate error checking for the previous PES packet. The PES extension flag 452 indicates the presence of data used for supporting MPEG-1 streams. Because the presence of optional fields 436 indicated by these flags creates an uncertain length of the total header area, a one-byte PES header data length field 434 helps define the total length of the header, which has the corollary effect of defining the length of the payload 406. Stuffing bytes 438 may be used to fill out a PES packet to a desired length.

FIG. 5 discloses the syntax of a transport stream packet according to MPEG 2 standards. In order to manage the transport stream 616 (FIG. 6) and identify the component packets 120-126 (FIG. 1), 220-228 (FIG. 2), within the transport stream 616, each transport stream packet ("TSP") has various overhead fields. Each transport stream packet 502, 504, 506, holds exactly 188 bytes. Each packet 502-506 is made up of a header 508 and a payload 510. The illustration of FIG. 5 includes a blow-up or expanded portion of the header 508, which is seen to include a packet identifier or PID field 512 among other fields. The PID field 512 is currently thirteen bits in length, ranging in hex values from 0000 to 1FFF, currently assigned as follows:

TABLE I

Values for PID Field

| Value | Description |
| --- | --- |
| 0×0000 | Program Association Table |
| 0×0001 | Conditional Access Table |
| 0×0002 | Transport Stream Description Table |
| 0×0003-0×000F | Reserved |
| 0×0010 through 0×1FFE | May be assigned as network_PID, Program_map, elementary-PID, or for other purposes. |
| 0×1FFF | Null Packet |

According to the Table I, the PIDs in the range of 0x0010 through 0x1FFE are used as identifiers for a particular type of data in a data stream, thereby distinguishing the audio and video packets of FIGS. 1 & 2. As previously noted, the "type" of data, whether audio or video, is stored in the PES packet. Accordingly, the PID is not used to designate the "type" of data, but is simply an identifier arbitrarily assigned to a particular collection of transport stream data packets. As noted earlier, the transport stream packet 504 includes a program clock reference (PCR) 516 in the adaptation field 514, the function of which will be explained further in conjunction with FIG. 7.

The fragmentation of the PES Packet 300 into multiple transport stream packets according to FIGS. 1-3 is not the final step in creating a transport stream. FIG. 6 illustrates a block diagram of a system for encoding, packetizing and multiplexing audio and video data into a transport stream. Video data 602 is input into a video encoder 604 where the video data is appropriately encoded. The encoding process refers to the preparation of PES packets, and may also involve the use of various compression schemes for the payload of the PES packet. MPEG 2 does not specify or limit the data format in the payload of the transport stream packet, and only sets forth a standard for the syntax of the transport stream packets themselves. Accordingly, the video encoder 604 and audio encoder 610 have the capability to utilize data compression techniques, or any other form of data manipulation. MPEG 2 transmission is not dependent on the type of data being stored in the payload. The data may be compressed, uncompressed, audio, video, games, or software. However, it is vital that the decoder at the other end of the stream is compliant, or the information in the PES payload will be meaningless. When transmitting audio and video data, the decode time stamp (DTS) and presentation time stamp (PTS) are added during the encoding process. These time stamps are not needed for other types of data which can theoretically be transmitted over MPEG 2, such as software, games, or still photographs.

An output of the video encoder 604 is coupled to a packetizer circuit 606 where the encoded video data is packetized, forming a PES stream. Audio data 608 is input into an audio encoder 610 where the audio data is appropriately encoded. An output of the audio encoder 610 is coupled to a packetizer circuit 612 where the encoded audio data is also packetized, forming an audio PES stream. Presentation time stamps and decode time stamps are typically generated at the encoders 604, 610, and respectively inserted into the PES packet header 404 by the packetizers 606, 612. As a result, video and audio data which are related, belonging to the same TV program or movie, are marked with the same time stamp by encoders using the same clock reference. Accordingly, the video and audio portions of the same movie or TV program, though transported in separate digital packets, can be reconstructed and synchronized at the output, thereby maintaining "lip synch." The packetized video data from the packetizer circuit 606 and the packetized audio data from the packetizer circuit 612 are then sent to a transport stream multiplexer circuit 614 where the packets of encoded audio and video data are then multiplexed together into a single transport stream 616. Accordingly, the transport stream packetization illustrated in FIGS. 1-3 takes place in the transport stream multiplexer 614 of FIG. 6. The transport stream multiplexer 614 then generates a time-multiplexed stream of data 616 as represented by the transport stream packets 220, 222, 120, 224, 122, 124, from FIGS. 1 and 2.

A time stamp called a program clock reference 516 (FIG. 5) is embedded in the extended header of select audio or video transport stream packets at the transport stream packetizing and multiplexing stage. The clock references occur at intervals up to 100 msec in a transport stream. Accordingly, MPEG standards require that the PCR be transmitted at least once every 100 msec. When the data stream is eventually received at an output, a phase-lock loop is used by the receiver to synchronize the receiver to the PCR value in the transport stream packet, and to adjust the local clock accordingly. This ensures that the movie or TV program will be displayed at the same speed it is being transmitted, without faster or slower portions. This feature is needed largely because transport stream packets are introduced to the transport stream asynchronously. That is, the length of time separating two successive video transport stream packets may be longer than the "actual" time separating the moving events pictured by the packets. Similarly, two packets may be transmitted consecutively with less transmission time separating them than actually occurred in real life. Without PCR values to guide the receiver, a video display would undulate—in an "accordion" fashion . . . fast, slow, fast, slow—according to the time between transport stream video packets. With the PCR values, the receiver regulates the presentation of the data to the same speed at which it was transmitted. This is particularly important in a "lossy" environment such as broadcast transmission. If a certain fraction of packets are interrupted due to noise or interference, the receiver can, upon receipt of the next PCR value, re-orient itself with the broadcaster. If, however, because the multiplexing of audio and video components of the same TV program are asynchronous, the program clock reference within the transport stream packets does not guarantee that the relative stream position of the audio packets to the video packets creates a proper time reference between them.

FIG. 7 shows the time-multiplexed transport stream 616 of FIG. 6 as it is demultiplexed and processed into the original digital audio information 100 and video information 200. The transport stream 616 enters an input of a transport stream demultiplexer 702, which separates the transport stream 616 into separate audio and video components. The video component is transmitted from a video output of the transport stream demultiplexer to an input of a video decoder 706 and output as a decoded video stream 710. The audio component is transmitted from an audio output of the transport stream demultiplexer 702 to an input of an audio decoder 708 and output as a decoded audio stream 712. As noted, if a video packet must be examined in an order different than it is to be presented to help interpret the contents of other packets, the decode time stamp value will define this order. The presentation time stamp values relate video and audio data from the same movie to ensure lip synch between the video and audio portions. The decoder clock must therefore reference itself to these time stamps. The decode and presentation time stamp values are static in the sense that they are equally applicable for a broadcast transmission of a movie, or the storage of a moving picture on a DVD. The program clock reference value, on the other hand, is necessary only in transport stream environments such as broadcast video, wherein a receiver must remain synchronized.

In digital TV broadcasting, multiple TV programs and movies can be multiplexed into a single MPEG-2 transport stream, forming a multicast. The audio and video encoders for the same movie must be synchronized to the same clock to ensure synchronization, but unrelated movies and programs need not be synchronized, and therefore, may be encoded independently using different encoders with different time bases. FIG. 8 is similar to FIG. 6, but illustrates the multiplexing process when multiple TV programs or movies are multiplexed into a single transport stream. Program_1 is a musical TV program of a vocal concert. The video data 802 from program_1, symbolized in FIGS. 8-10 by a human figure, enters the input of the first video encoder 804. After encoding, it is directed to the input of a PES packetizer 806, forming the video_1 program elementary stream (PES) 816. The audio data 810 of program_1, symbolized by a musical note, enters the input of the first audio encoder 812. After encoding, it is directed to the input of a PES packetizer 814, forming the audio_1 PES 818. Clock 1 808 is used to create a common time base for the presentation time stamps stored within the optional field 436 of the PES packet of FIG. 4. These time stamps are thereby embedded in the packets comprising the video_1 program elementary stream 816 and the audio_1 program elementary stream 818, thereby ensuring that they are referenced against the same time base. This allows the decoding process to synchronize the video and audio portions of program_1 when the concert is reproduced at a user output such as a TV. English subtitle_1 data 852 is used for exemplary purposes to illustrate that any number of other component parts, such as subtitles, could be associated with program_1. Because subtitles must be synchronized with the audio and video portions, the PES packetizer 854 of the English subtitle 1 data is also controlled by the clock 808 associated with program_1.

Program_2 is a movie, the video portion of which is graphically symbolized by a dog. The video data 820 from program_2 enters the input of the second video encoder 822. After encoding, it is directed to the input of a PES packetizer 824, forming the video_2 program elementary stream 832. The audio data 826 of program_2, symbolized by a graph of a sound envelope of a dog barking, enters the input of the second audio encoder 828. After encoding, it is directed to the input of the audio PES packetizer 830, forming the audio_2 PES program elementary stream 834. Program_2 is also seen to have an English subtitle component 860 which is similarly processed. Clock 2 is similarly used to generate a common time base for the presentation time stamps stored in the optional field 436 of a PES packet as illustrated in FIG. 4. The presentation time stamps are thus embedded in the video_2 PES packets forming the video_2 program elementary stream 832, the audio_2 PES packets 834 and the English subtitle_2 PES packets 864 to allow synchronization upon decoding. Because program_1 and program_2 are unrelated, and do not need to be synchronized with each other, separate clocks 808, 836 may be used for the separate programs. The video_1 program elementary stream 816, audio_1 program elementary stream 818, English subtitle_1 program elementary stream 856, video_2 program elementary stream 832, audio_2 program elementary stream 834, and English subtitle_2 program elementary stream 864 are input into a transport stream multiplexer 840. The multiplexer 840 further packetizes the PES packets into transport stream packets, as previously illustrated in FIGS. 1-3 discussed above, and time multiplexes them into a common multi-program transport stream 850, as further illustrated in FIGS. 9 and 10. The clock circuit 3 842 is coupled with the transport stream multiplexer 840 to generate program clock reference (PCR) time stamps stored in the PCR field 516 (FIG. 5) of the packets within the transport stream 850. These time stamps are embedded in select transport stream packets 1002, . . . , 1028 (FIGS. 10, 11).

FIG. 9 illustrates an example of two transport streams TS1 and TS2 multiplexed into a single transport stream, TS3. Packets from the transport stream TS1 are illustrated as having a series of time stamps from a first multiplexing process, the time stamps represented as PCR 1-*a* and PCR 1-*b*. Similarly, the packets from the transport stream TS2 are illustrated as having a series of time stamps from a second multiplexing process, the time stamps represented as PCR 2-1 and PCR 2-*b*. When the two transport streams TS1 and TS2 are multiplexed into a single transport stream, TS3, the multiplexing process strips out the old PCR time stamps from the transport stream packets of TS1 and TS2, and inserts new PCR time stamps, illustrated as PCR 3-*a*, PCR 3-*b*, PCR 3-*c* and PCR 3*d* in the succession of transport stream packets. In addition to updating some of the time stamps, other overhead features such as new PIDs are typically updated as well, and new program map tables PMTs are generated to reflect the information contained in the new combined stream. These overhead changes are largely transparent to the end user, however, and the payload data from the original data stream remains unaffected when the streams are combined. FIG. 9 illustrates packets comprising payload data and select overhead data being combined from the transport streams TS 1 and TS 2 into the transport stream TS3. The illustration shows the select overhead data being updated in transport stream 3 while the payload data in the form of Video 1 and Video 2 remain unaffected.

FIG. 10 is an illustration of an exemplary multi-program transport stream 850 generated through the multi-program multiplexing apparatus of FIG. 8. The multi-program transport stream 850 is comprised of a series of transport stream packets 1002, . . . , 1028. In this example, video__1 transport stream packets 1002, 1012, 1024 have been assigned a PID of 0027h by the transport stream multiplexer 840 of FIG. 8. The audio__1 transport stream packet 1006 has been assigned a PID of 0034h, the video__2 transport stream packets 1004, 1010, 1020 have been assigned a PID of 0061h, and the audio__2 transport stream packet 1016 has been assigned a PID of 0042h. Two separate English subtitles transport stream packets 1026, 1028 are respectively assigned PIDs of 0039h and 0051h, and a French subtitle transport stream packet 1022 has been assigned the PID of 0072h.

Because the time-multiplexing is asynchronous, there is no reliable way of relating a subtitle or audio portion of a program or movie to its respective video portion simply by its respective position in the transport stream 850. In order to relate the correct component parts of the same program during output processing, multi-program transport streams 850 have additional transport stream packets not typically found in the single program transport stream 616 (FIG. 6). These additional transport stream packets include a program association table (PAT) 1008, which is always assigned a PID of zero, and multiple program map tables (PMTs) 1014, 1018. The function of these transport stream packets can be understood by examining the blow-up versions of the PAT 1008 and the PMTs 1014, 1018 in FIG. 10. The PAT 1008 lists all programs currently included in the transport stream. As seen in FIG. 10, there are five programs, each cross referenced to PID numbers representing that program. For as many programs as are referenced in the PAT 1008, the transport stream includes a program map table (PMT) designated by the PID referenced in the PAT 1008. Program__1 has a PID value of 0025h, and program__2 has a PID value of 0057h. Examining the blow up of the PMT 1016 of program__1, it is seen that the video transport packets having a PID value of 0027h, the audio transport stream packets having a PID value of 0034h, and the English subtitle transport stream packets having a PID value of 0039h are all component parts of program__1, the vocal concert. Similarly, examining the blow up portion of PMT 1018 of program__2, it is seen that the video transport stream packet having a PID value of 0061h, the audio packets having a PID value of 0042h, the English subtitle packets having a PID value of 0051h and the French subtitle packets having a PID value of 0072h are all component parts of program__2, an animal movie. By regular transmission of the PAT 1008, a broadcast receiver is able to know how many programs are present, and the PID of the respective PMTs 1014, 1018 of those respective programs. A "channel selection" or program schedule for cable TV may thus be generated with the assistance of the PAT 1008. Once a user selects a particular channel or program, the broadcast receiver 1200 (FIG. 12) identifies the component parts of that channel by referencing the PMT 1014, 1018 of that particular channel. It should be understood that the other programs 3, 4, 5 within the PAT also have a corresponding PMT.

FIG. 11 shows the multi-program transport stream 850 of FIGS. 8 and 10 being filtered through a prior art filtering table 1102 of a broadcast receiver. Upon selection of a program by a user, the PAT identifies the PMT for that program. In the example of FIG. 11, the filtering table 1102 can be seen to hold the PAT 0000h, the PMT 0025h for program__1, and the video 0027h, audio 0034h, and subtitles 0039h associated with program__1 according to the PMT 1014. Additionally, the filtering table 1102 identifies two hypothetical overhead PIDs, 00A2 and 07B0. According to the exemplary system illustrated in FIG. 11, therefore, there are currently seven PIDs identified in the filtering table 1102. The filtering table 1102 acts to receive only those transport stream packets defined by an approved PID listed in the filtering table 1102. An examination of the transport stream packets 1002, 1006, 1008, 1012, 1014, 1024, 1026 stored in the filtered packet input FIFO buffer 1104 discloses that they are the same packets in the same order as found in the multi-program transport stream 850, except that those packets identified by PIDs not listed in the filtering table 1102 have been filtered out, and are not stored in the filtered packet input FIFO buffer 1104. Only the approved transport stream packets 1002, 1006, 1008, 1012, 1014, 1024, 1026 from the transport stream 850 which include PID values matching those within the filtering table 1102 are received and stored in a general input FIFO buffer 1104. From the general input FIFO buffer, the filtered transport stream packets are sent to a demultiplexer 1106, and are separated into their component PIDs in various component buffers, such as an audio buffer 1108 for packets that include the audio PID 0034h, and a video buffer 1110 for video packets that include the PID 0027h.

Filtering tables currently used in broadcast receivers typically have thirty-two PID registers to select transport stream packets. Because filtering tables currently in use are a fixed hardware component, broadcast receivers cannot be configured for filtering more than thirty-two distinct PIDs. There are two disadvantages of this fixed architecture. First, the number of PIDs required to be included in the filtering table could exceed the capacity of the filtering table. To upgrade a fixed architecture filtering table requires a costly hardware update. Moreover, upgrading a filtering table with a new fixed architecture filtering table of greater capacity does not resolve all issues. It is commonly recognized by those skilled in the art that digital devices normally operate at a more rapid speed in the "lower" addressable regions. Accordingly, if a filtering table were expanded to some great number of registers, it would be very flexible, but not optimal in terms of speed or cost. These conflicting interests create a dilemma in the manufacture of filtering tables. An optimal filtering table is the smallest size necessary to function in a given application at a given time. However, the most flexible filtering table is the one with the largest capacity, such that it can store more PIDs or other parameters as more PIDs are allocated to define more kinds of data.

A second limiting factor in fixed architecture filtering tables is the bit field for storing the PID. Currently, as established by international standard ISO/IEC 13818-1, the PID bit field is thirteen bits. If international standards increase the bit field 512 (FIG. 5) designated for storage of the PID in MPEG 2 from thirteen bits to some greater number, present fixed architecture filtering tables will be obsolete, and must again be upgraded. Again, however, creating an unnecessary large bit field for "growth" is again a sub-optimal solution. The same dilemma, optimum flexibility for growth vs. optimum efficiency in cost and performance is repeated.

Another limitation of the prior art is experienced through the actual data storage. An optimal FIFO Buffer 1104 is the smallest necessary to store the incoming data. However, the bit rate of a data transport stream 850 differs according to country, broadcaster, and even through momentary changes in the system use. Because the FIFO Buffer 1104 and the post-multiplexing buffers 1108, 1110 must be able to store incoming data as fast as it is received through the filtering table 1102, a fixed hardware structure as presently used limits the rate at which input data may be received. With fiber optical transmission and processing technology advancing rapidly, the ever faster input rates for incoming data create the corollary need for a greater capacity among the input buffers. Alternatively, faster processing of incoming software might reduce the required size of any of the input buffers 1104, 1108, 1110. Similarly, without any changes in transmission rate or processing speeds, one program may have five languages, and closed captioning in each. Another may simply be broadcast in one language with no closed captioning. These differences mean that different amounts of data will be filtered through the filtering table and marked for storage in the various buffers, requiring buffers of greater or lesser storage capacity. Accordingly, even without technological advances, the input tables 1104, 1108, 1110 may prove too small, thereby limiting the programming receivable by the broadcast receiver, or too large, thus being sub-optimal. The same dilemma arises again in fixed architecture data buffers such as the filtered packet input FIFO buffer 1104, and the post-multiplexing data buffers such as the audio buffer 1108 and video buffer 1110. The optimal size on a FIFO input buffer 1104 for performance and cost is typically the smallest size necessary to satisfy system demands. However, if the FIFO input buffer 1104 is optimized to the smallest functional buffer, as the bit rate increases for any variety of reasons, the hardware comprising the FIFO input buffer 1104 must be replaced with a buffer of greater capacity to prevent the filtered transport stream data from overflowing. Similarly, the audio buffer 1108 and video buffer 1110 may not be increased or decreased without new hardware.

A final limitation of the prior art stems from the fact that hardware is configured for a fixed number of "filtered-data buffers" such as the audio buffer 1108 and the video buffer 1110. A broadcast in forty languages would require not only forty or more registers in the filtering table 1102, it could, depending on the architecture, require over forty post-demultiplexing buffers 1108, 1110 in which to segregate incoming data. Once again, a hardware architecture which is mapped with a fixed number of filtered-data buffers must be replaced with a new chip to respond to the changing demands for the number of storage buffers, as well as the capacity of each of those buffers as already noted. With a fixed architecture, the alternatives are, again, conflicting. A broadcast receiver with a greater number of buffers 1104, 1108, 1110 is more flexible, but a broadcast receiver with the minimal number of buffers necessary is optimal in terms of cost and efficiency.

SUMMARY OF THE INVENTION

The present invention provides a flexible memory architecture that allows a filtering table to be scaled to an optimal number of parameters without performing a hardware upgrade to the system including the filtering tables. The present invention further provides a flexible memory architecture that allows a filtering table to be scaled to accommodate variable bit lengths of PIDs or other packet parameters as standards are upgraded or changed. The present invention further provides a flexible memory architecture that allows a FIFO input buffer and various filtered-data buffers to be scaled to an optimal size in response to changing bit rates of an incoming digital stream. The present invention further provides a flexible memory architecture which allows the creation of an optimal number of filtered-data buffers for storing different types of de-multiplexed data in response to changing character of a data transport stream or changing specifications within the filtering table.

According to the present invention, a broadcast receiver processes digital data from a multiplexed digital transport stream. The transport stream comprises a plurality of transport packets, wherein each transport packet is defined by a parameter identifier. The broadcast receiver comprises a receiving unit for receiving the multiplexed transport stream, a memory area for storing incoming digital data, a scalable filtering table for identifying at least one parameter identifier among a potential plurality of parameter identifiers within the multiplexed transport stream data, the scalable filtering table comprising a first logical register for storing a digital value corresponding to a parameter identifier within a transport packet, wherein the filtering table allows a transport packet defined by a parameter identifier having a corresponding digital value stored within the filtering table to be stored in the memory area of the broadcast receiver; and a controller configured to vary a number of logical registers within the scalable filtering table, to optimally store a select number of distinct digital values within the filtering table corresponding to select parameter identifiers. According to one embodiment, the parameter identifier is a packet identifier in an MPEG 2 digital transport stream. The controller is configured to generate a digital value according to a packet identifier present within a transport packet within the transport stream and to store the digital value within the first logical register of the scalable filtering table. According to one embodiment, the controller is capable of scaling a bit length of each logical register according to a select bit length, which is advantageously determined by the controller by measuring a maximum bit length of the packet identifiers within the multiplexed transport stream. The scalable filtering table is advantageously comprised of an erasable medium capable of storing digital information. As an erasable medium, the scalable filtering table may be dynamically re-scaled and re-configured as often as necessary to conform to dynamic changes in transport stream parameters.

A broadcast receiver receives digital data from a multiplexed transport stream. The transport stream comprises a plurality of transport packets, wherein each transport packet is defined by a packet identifier. The broadcast receiver comprises a receiving unit for receiving the multiplexed transport stream, a filtering table for identifying at least one packet identifier among a potential plurality of packet identifiers within the multiplexed transport stream, a scalable input buffer for receiving input data from the multiplexed transport input stream a scalable input buffer, and a controller for scaling the scalable input buffer. The controller scales the scalable input buffer according to a bit rate of the multiplexed transport input stream. According to one embodiment, the controller generates a plurality of scalable input buffers, including post-multiplexing input buffers for storing a homogeneous data type selected from a group including video data, audio data and system data.

One embodiment of the present invention comprises a method of scaling a filtering table within a broadcast receiver. The filtering table comprises a first column in an erasable digital medium, wherein the scaling filtering table is used to assist in selectively filtering select data packets from a multiplexed transport stream of digital data comprising a plurality of data packets. The method comprises the steps of determining a desired number of select digital parameters from among a first family of digital parameters, mapping the first column to create a first select number of digital fields such that the first select number of digital fields sufficient to store the select digital parameters; and storing the select digital parameters from among the first family of digital parameters in respective digital fields within the first column. According to one embodiment, the first family of digital parameters is the packet identifier of an MPEG 2 transport stream packet. According to one embodiment, the scalable filtering table further comprises a second scalable column for storing a second family of digital parameters. The size of the second column is established by determining a desired number of select digital parameters from among the second family of digital parameters, mapping the second column to create a second select number of digital fields such that the second select number of digital fields within the second column is sufficient to store the select digital parameters from among the second family of digital parameters, and storing the select digital parameters of the second family of digital parameters in respective digital fields within the second column. According to one embodiment, the field size necessary for storing a second digital parameter from among a second family of digital parameters is determined by measuring the field size of a the second digital parameter within the multiplexed transport data stream from the second family of digital parameters and mapping a second digital field within the second column such that the second digital field is large enough to store the second digital parameter.

These and other advantages will become apparent to those of ordinary skill in the art after having read the following detailed description of the preferred embodiments which are illustrated in the various drawings and figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 19 illustrates two different views of the same filtering table, variously scaled for five values and twelve values.

Figure 1:
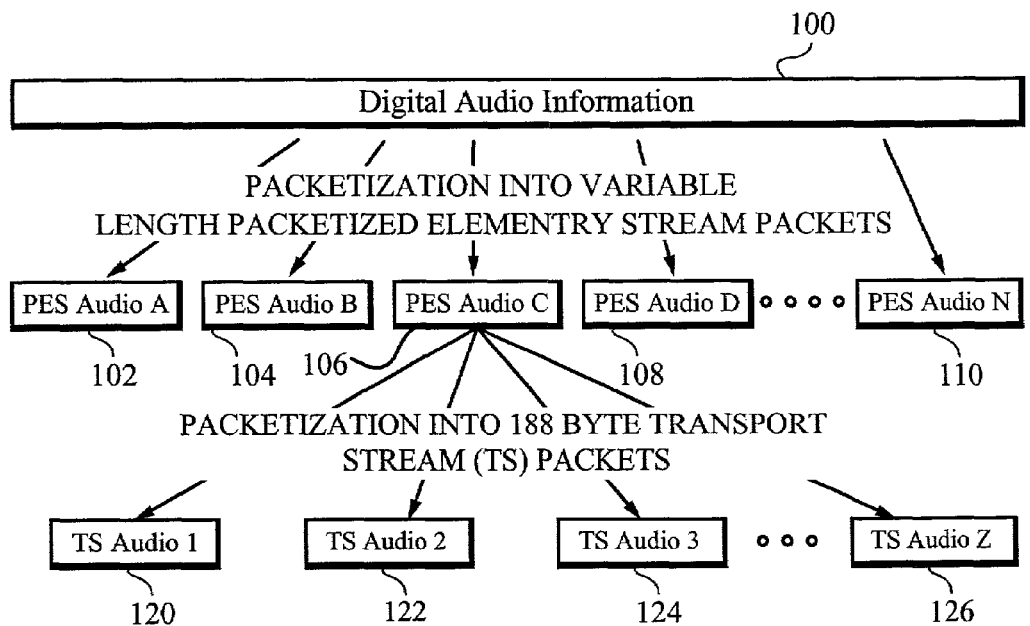
FIG. 1 illustrates digital audio information from a "continuous" collection of digital audio data being packetized into PES packets, which are further packetized into transport stream packets.
Figure 2:
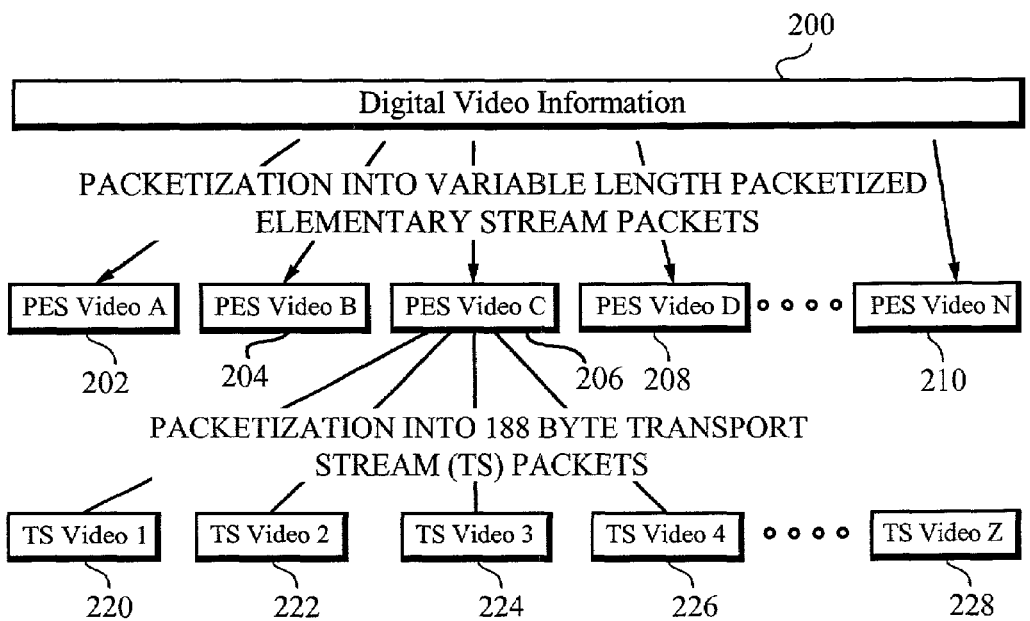
FIG. 2 illustrates digital video information from a "continuous" collection of digital video data being packetized into PES packets, which are further packetized into transport stream packets.
Figure 3:
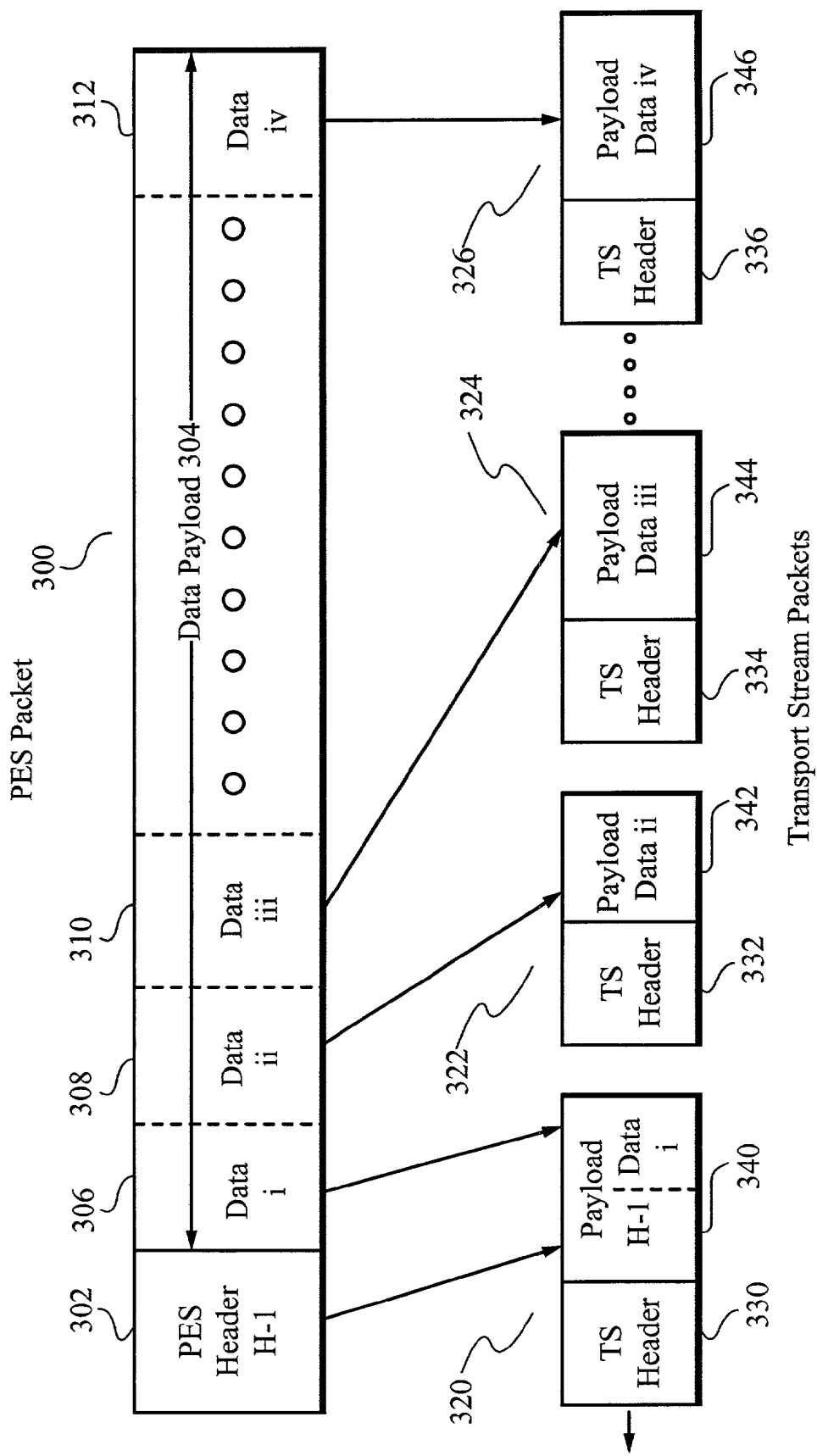
FIG. 3 illustrates a more detailed diagram of a PES packet being divided into a plurality of transport stream packets.
Figure 4:
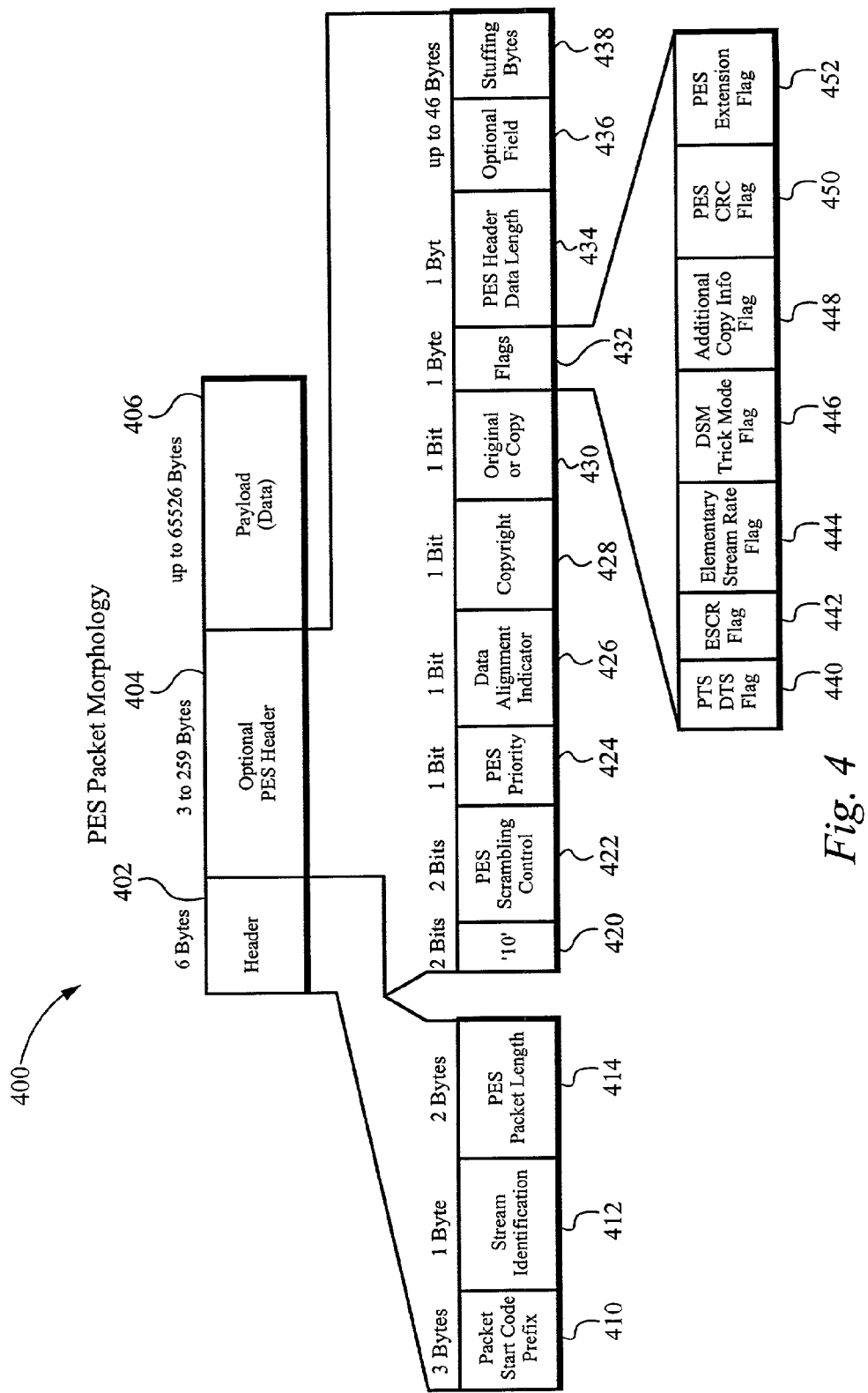
FIG. 4 illustrates the fields within a PES packet.

DETAILED DESCRIPTION OF THE INVENTION:

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to more fully illustrate the present invention. However, it will be apparent to one of ordinary skill in the prior art that the present invention may be practiced without these specific details. For example, although reference is made to transport stream architecture according to ISO/IEC 13818-1 (MPEG 2) standards, those skilled in the art will understand that the objects of the present invention are applicable in any digital transport stream comprising packetized data which is distinguishable through a digital code or codes contained in a packet header. In other instances, well-known methods and procedures, components and processes have not been described in detail so as not to unnecessarily obscure aspects of the present invention. For example, there are numerous fields within a transport stream packet header 508 (FIG. 5) which are subject to evaluation by a filtering table discussed herein. Specific reference is made to the PID field, and general reference is made to "parameters." Those skilled in the art will understand that a general reference to "parameters" is not limited to the PID field as recited in specific examples herein, but that the principles are applicable to any digital field, particularly those fields which comprise the transport stream header according to the MPEG 2 morphology depicted in FIG. 5, and is applicable to any parameters stored in a packet header of any transport stream.

As used herein, the term register refers to a memory storage location including a register, entry and/or field including a memory storage location on a magnetic medium, within a flash memory, RAM or any other appropriate memory storage.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the arts. A procedure, logic block, process, etc., is here, and generally, conceived to be a self-consistent sequence of steps or instructions leading to a desired result. These steps are those requiring sensing or physical manipulations of physical quantities.

Figure 12:
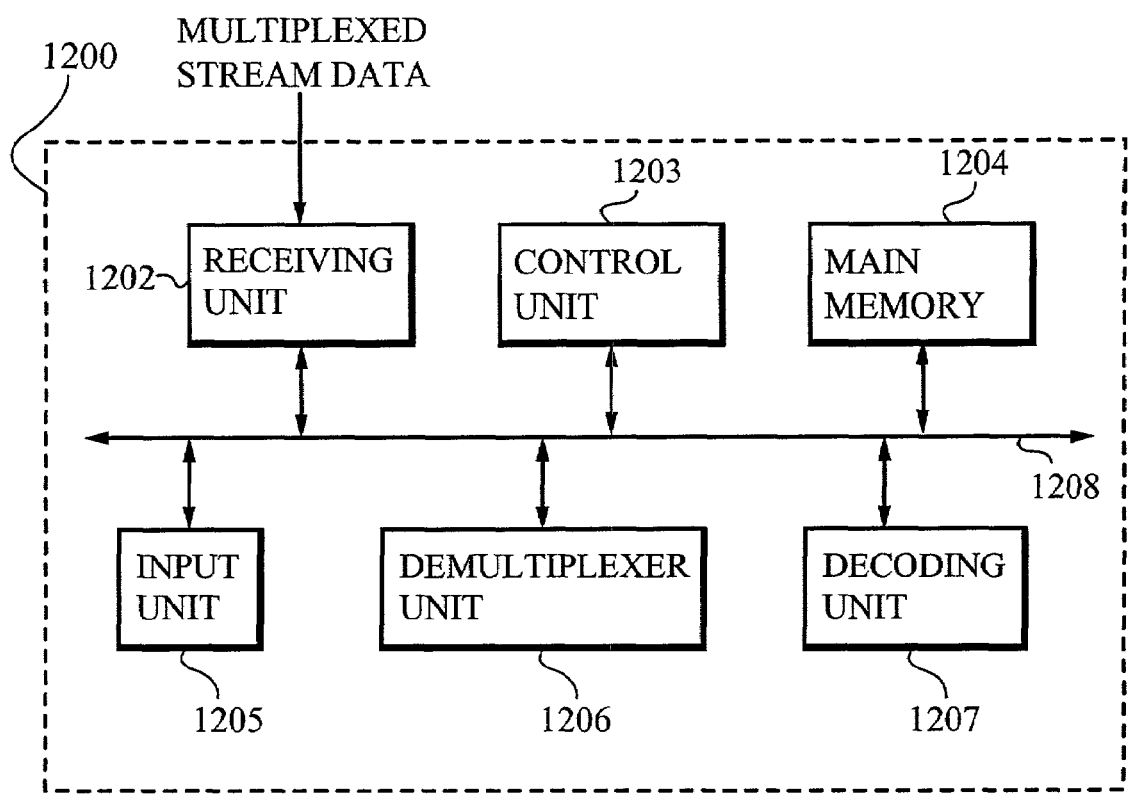
FIG. 12 shows component portions of a broadcast receiver.

FIG. 12 shows the structure of a broadcast receiver or Settop Box 1200 according to one embodiment of the present invention.

A user uses an input unit 1205 to select a channel or program being broadcast over a multi-program transport stream. Additionally, the input unit 1205 may perform functions such as selecting options, switching-on and resetting of the main power, etc. The input unit 1205 supplies an operation signal to a control unit 1203 via a bus 1208. Those skilled in the art will understand however that the separate component parts 1202-1207 could be merged into a single integrated control unit capable of performing the multiple functions represented by the individual blocks in FIG. 12. Accordingly, the bus 1208 is optional according to the architecture of the Settop Box 1200.

A receiving unit 1202 receives externally-supplied multiplexed transport stream data, and supplies the received transport stream data to a main memory 1204 via the bus 1208. The receiving unit 1202 includes a tuner, a demodulating circuit, and an error correcting circuit.

Figure 13:
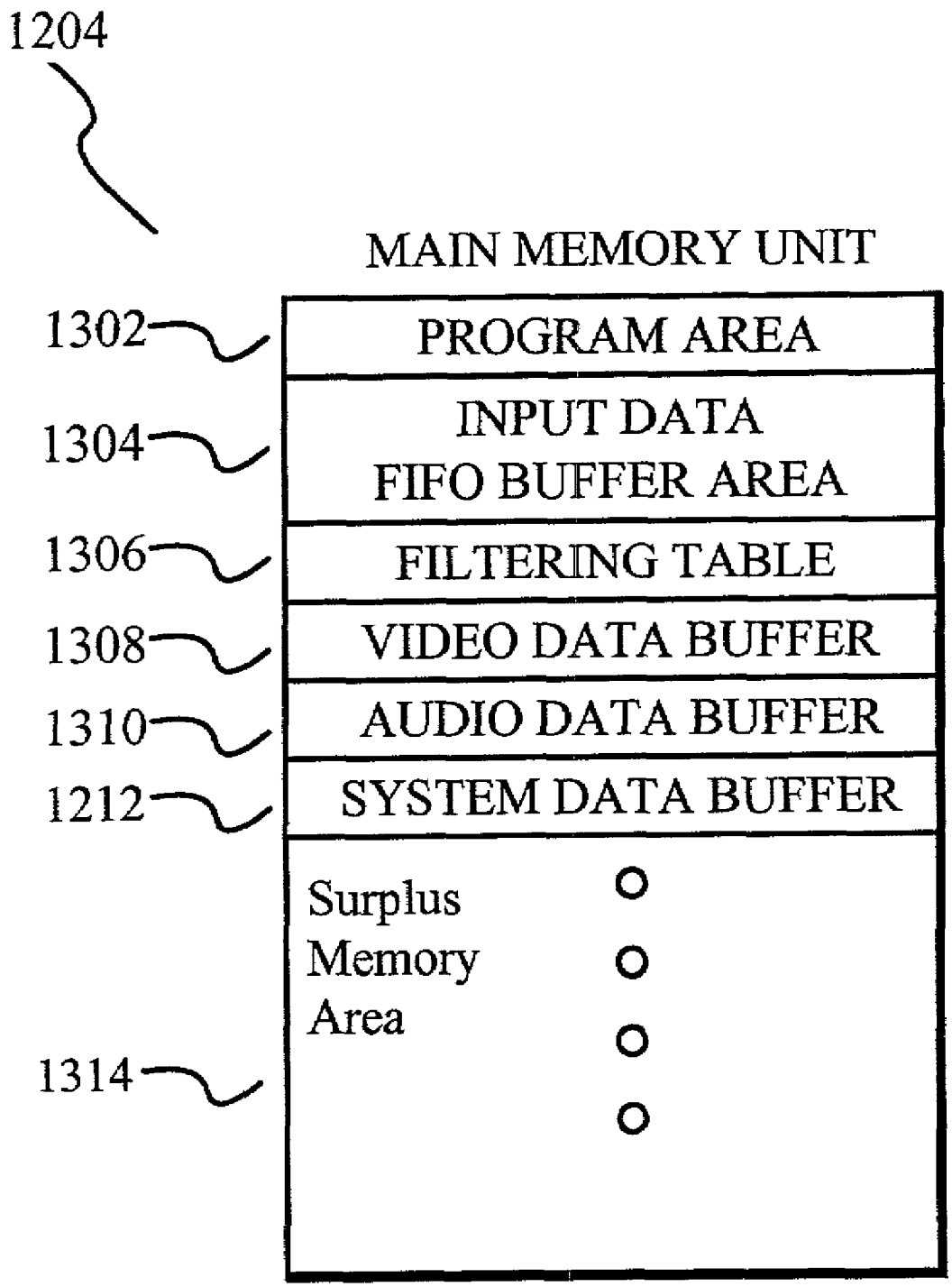
FIG. 13 is an illustration of a scalable memory area including a scalable filtering table and scalable buffers.

According to the details of FIG. 13, the main memory 1204 includes a program area 1302, a FIFO input buffer 1304, a filtering table 1306, a video data buffer 1308, an audio data buffer 1310, a system buffer 1312, and a surplus memory area 1314. As will be further illustrated, the surplus memory area 1314 can be used for expanding existing memory areas 1302-1312, or for mapping and creating additional memory areas. An example of new memory areas would be multiple audio buffers created for multiple languages in a stream simultaneous with an audio portion. According to the preferred embodiment, the main memory unit 1204 involves a single memory area which affords rapid access for read and write operations. Such high speed read/write capability is essential to the temporary storage of incoming data. Alternatively, however, the memory areas 1302-1314 comprising the main memory unit 1204 could be comprised of a combination of multiple memory types. The program area 1302 stores a program which governs memory mapping and utilization of the memory area. The program is configured to expand memory areas as needed as well as creating or deleting additional memory areas. Although those skilled in the art will recognize that an area of memory may be "fragmented" over a noncontinuous range of addresses, according to the preferred embodiment, memory scaling will entail a re-adjustment of the entire memory area to minimize or reduce fragmentation, thereby optimizing the speed and efficiency of the memory area.

Figures 14A, 14B, 14C:
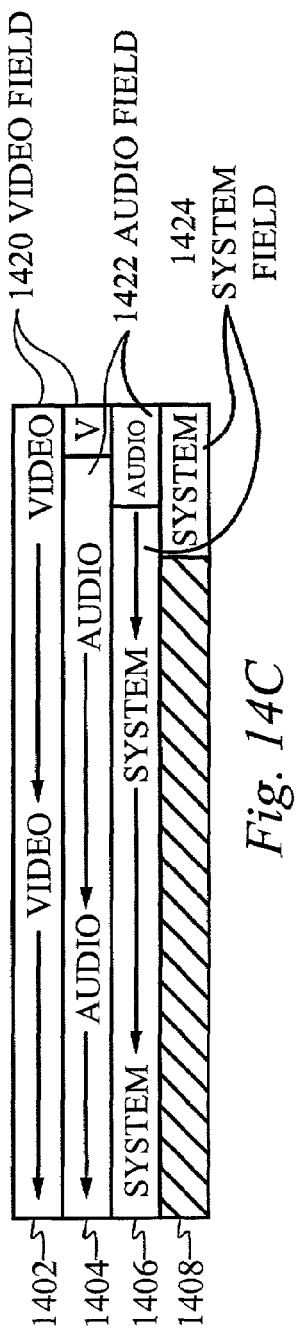
FIG. 14 illustrates alternative approaches for scaling a filtering table to accommodate variable length PIDs according to the present invention.

FIG. 14A is an illustration of a scalable filtering table wherein the PID table is configured in one-word (sixteen bit) registers for accommodating a conventional 13 bit PID. According to the exemplary architecture, each PID is stored in the least significant bits 0-12 of a word. For exemplary purposes, the scalable filtering table is seen to contain three PIDs, audio, video, and system. FIG. 14B is an illustration of a re-mapped filtering table configured to accommodate the same three PIDs in a 17 bit format. According to the architecture of FIG. 14B, the 17 bit video PID is seen to take up the entire first word 1402 and the first bit (bit zero, the least significant bit) of the second word 1404. Bits 1-15 of the second word are unused. It is further noted that FIG. 14B has expanded the actual memory area of the filtering table by three words, 1408, 1410 and 1412. As previously discussed, according to the preferred embodiment, when a specific memory area such as a filtering table or input FIFO buffer is expanded to encompass new memory, it will follow a continuous addressing scheme rather than being fragmented across discontinuous sectors or address ranges. An alternative architecture for storing a 17 bit PID is seen in FIG. 14C, wherein the video PID begins in bit zero of the first word 1402 and extends through bit zero of the second word. The audio PID is stored immediately thereafter, starting with bit 1 of the second word, and continuing through bit 1 of the third word 1406. The system PID begins in bit 2 of the third word 1406, and continues through bit 2 of the fourth word 1408. The remaining bits of the fourth word 1406 are unused.

The example of expanding a PID register from thirteen bits to seventeen bits was selected to illustrate the mapping and architectural options which exist when extending a field into a second word. Those skilled in the art will understand that FIG. 14 is not intended to limit the expansion of a PID field from thirteen to seventeen bits, nor to limit the architectural schemes for expanding the bit field used to store a PID. Accordingly, FIG. 14 is simply an example of the process of re-mapping a scalable memory. Because a great variety of mapping, addressing and architectural approaches are well known to those skilled in the art, the scaling of other memory areas will hereinafter be addressed and illustrated in more generic terms without specific detail as to the mapping, addressing or architecture which might be used.

Although changing parameters in MPEG 2 standards could account for one reason a filtering table register is expanded or contracted, it is not always necessary to examine an entire PID value to filter the data properly. This can be illustrated by considering the following exemplary data strings in conjunction with FIG. 14A:

0 0110 1101 1001 Video data 1 0111 1010 1000 Audiodata 0 1110 0001 1110 System data 0 1000 1010 0110 Unwanted data 1

1 1011 1101 0111 Unwanted data 1

0 1100 0000 0101 Unwanted data 3

It is seen that, counting right to left from the first bit (bit zero), the fourth bit of the video, audio and system data is uniformly a one, and the fourth bit of the unwanted data is uniformly a zero.

From this exemplary data, it would therefore be possible to filter the unwanted data from the 25 video, audio and system data simply by examining the four least significant bits of an incoming PID, or by simply determining whether an incoming PID had a "one" in the fourth bit field. All data fields that were not relevant could be masked since a comparison of the remaining bits would be unnecessary.

Figure 15:
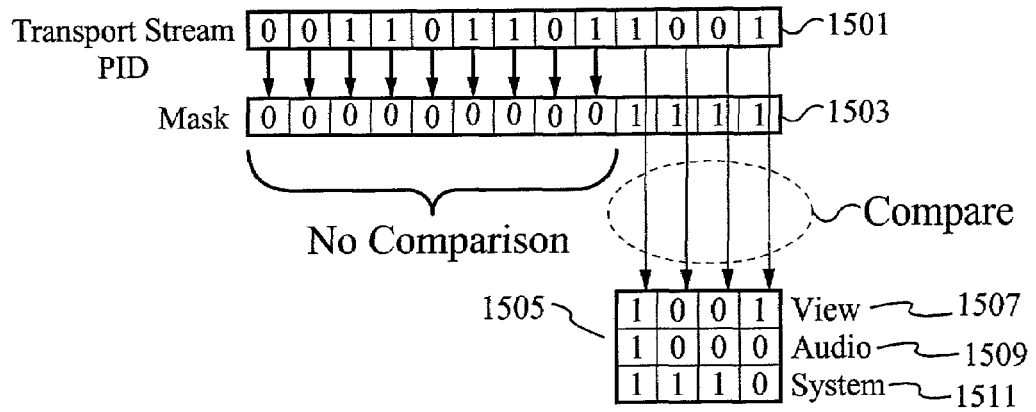
FIG. 15 illustrates an application of a masked comparison in the filtering process.

FIG. 15 is one embodiment of a masked comparison in conjunction with the present invention. A masked comparison is performed between an incoming PID 1501 in a transport stream and the values in the filtering table 1505. It is noted that the transport stream PID is the same as the video data listed above. Consistent with the exemplary values listed above, because only the desired PIDs have a one in the fourth bit of the PID field, whereas the non-desired values have a zero in the fourth bit of the PID field, a filtering table 1505 may be configured that requires the values of only the four least significant bits. The mask 1503 is interpreted as one which allows comparison of bits from the transport stream PID 1501 against the filtering table 1505 values 1507, 1509, 1511 only with respect to the "one" bits in the mask. According to such an implementation, it can be seen that a filtering table of only four bits in width is necessary.

Figure 16:
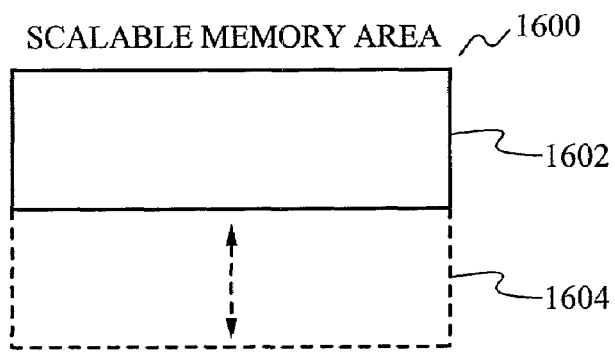
FIG. 16 illustrates a scalable memory area for accommodating a greater or fewer number of values according to the present invention.

FIG. 16 discloses a generic scalable memory area 1600. This area can be contracted to a smaller region 1602, or expanded to encompass additional memory area 1604. The scaling of the memory area in FIG. 16 can be applied to any memory area according to FIG. 13, including additional memory areas which might be constructed in the surplus memory area 1314 (FIG. 13). Although the preferred embodiment is a contiguous scalable memory area as illustrated in FIG. 16, it should be understood by those skilled in the art that the scalable memory area may alternatively be fragmented across a dis-contiguous area.

According to one embodiment, the input data buffer 1304 is scaled during start up. The program area 1302 stores a program which describes the processing to be performed when the STB 1200 is booted (the switching-on or resetting of the main power). In the program, a value of the bit rate of the transport stream data to be input to the receiving unit 1202 is described at a predetermined position, and the value of the bit rate can be rewritten as required. Accordingly, when the value of the bit rate to be input is changed, it is only required that the described value of the bit rate be rewritten. The FIFO buffer area 1304 temporarily stores the transport stream data supplied from the receiving unit 1202. The optimal size (area) of the FIFO buffer area 1304 is determined based on the result of the arithmetic operation by the control unit 1203 (described below).

When the control unit 1203 is supplied with the operation signal (a main-power switching-on signal or a reset signal) from the input unit 1205, it reads, from the program area 1302 of the main memory 1204, the bit-rate value of the transport stream data stored beforehand. The control unit 1203 computes the optimal size of the FIFO buffer area 1304, based on the read bit-rate value, and reserves, in the main memory 1204, the FIFO buffer area 1304 based on a result of the computation. The transport stream data from the receiving unit 1202 is supplied and stored in the FIFO buffer area 1304 reserved in the main memory 1204. In view of the cost of memory, and increased speed and efficiency when processing a smaller addressable content of lower addresses, it is advantageous to set the optimal size of the FIFO buffer area 1304 to the minimum necessary value which will prevent the data stream from overflowing.

A demultiplexer unit 1206 is supplied with the transport stream data from the FIFO buffer area 1304 of the main memory 1204. The demultiplexer unit 1206 separates the supplied transport stream data into various types of data (e.g., video data, audio data, etc.), and supplies the separated data to a decoding unit 1207 via the bus 1208.

Figure 17:
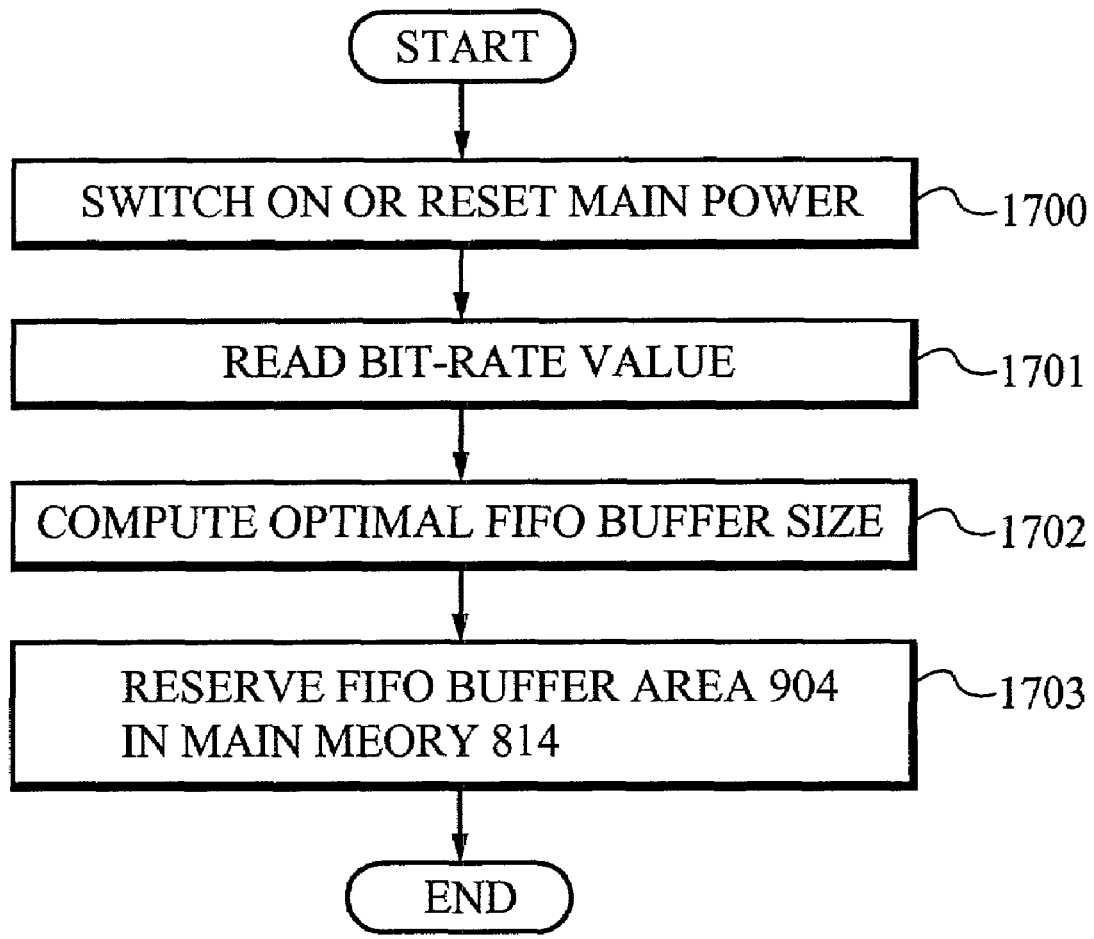
FIG. 17 illustrates a flow chart for scaling input buffers on power up.

FIG. 17 discloses a process for scaling an area of memory. Although the process disclosed in FIG. 17 recites the scaling of a FIFO buffer 1304, those skilled in the art will recognize that a similar process may be used for scaling any area of memory when the optimal size of that memory area is based on the bit-rate value of the transport stream data.

In step 1700, when the user switches on or resets the main power by operating the input unit 1205, the operation signal (main-power switching-on signal or reset signal) is supplied to the control unit 1203 via the bus 1208. As noted above, however, it is understood that the separate component parts 1202-1207 could be merged into a single integrated control unit capable of performing the multiple functions represented by the individual blocks in FIG. 12. Accordingly, the bus 1208 is optional according to the architecture of the Settop Box 1200.

In step 1701, the control unit 1203 reads, via the bus 1208, the bit-rate value of the transport stream data stored beforehand in the program area 1302 of the main memory 1204.

In the step 1702, the control unit 1203 computes, based on the read bit-rate value, the optimal size of the FIFO buffer area 1304, and confirms it.

In step 1703, the control unit 1203 reserves, based on a result of the computation in step 1702, the FIFO buffer area 1304 in the main memory 1204. The process is then terminated.

In the foregoing description, the case where the value of a bit rate of transport stream data is described beforehand in a program. By way of example, by providing a detector for detecting an input bit rate, an optimal FIFO buffer size may be determined by performing the above-described computation based on the value of the bit rate output from the detector.

In the foregoing description, the main memory 1204 is used in a form in which it is divided into the program area and the FIFO buffer area. However, a memory for storing a program may be provided separately from the main memory 1204. For example, a rewritable nonvolatile flash memory may be used as the memory for storing a program, and a volatile RAM may be used as the memory for the FIFO buffer.

In the present invention, the types of provision media for providing the user with a computer program executing the above-described process include not only information recording media such as magnetic disks and CD-ROMs but also network-based transmission media such as the Internet and digital satellite.

As described above, according to the present invention, based on the bit rate of the transport stream data, an optimal buffer size is computed, and based on the result of the computation, the buffer area is changed, whereby memory can be effectively used.

It is understood that the scaling of specific filtered-data memory areas such as the video data buffer 1308 and the audio data buffer 1310 are performed in a like manner as the scaling of the input FIFO buffer area 1304. Specifically, the bit rate of a particular data type defined by a particular PID is determined, and the control unit 1203 utilizes this information to expand the buffer designated to store that particular data type.

Figure 5:
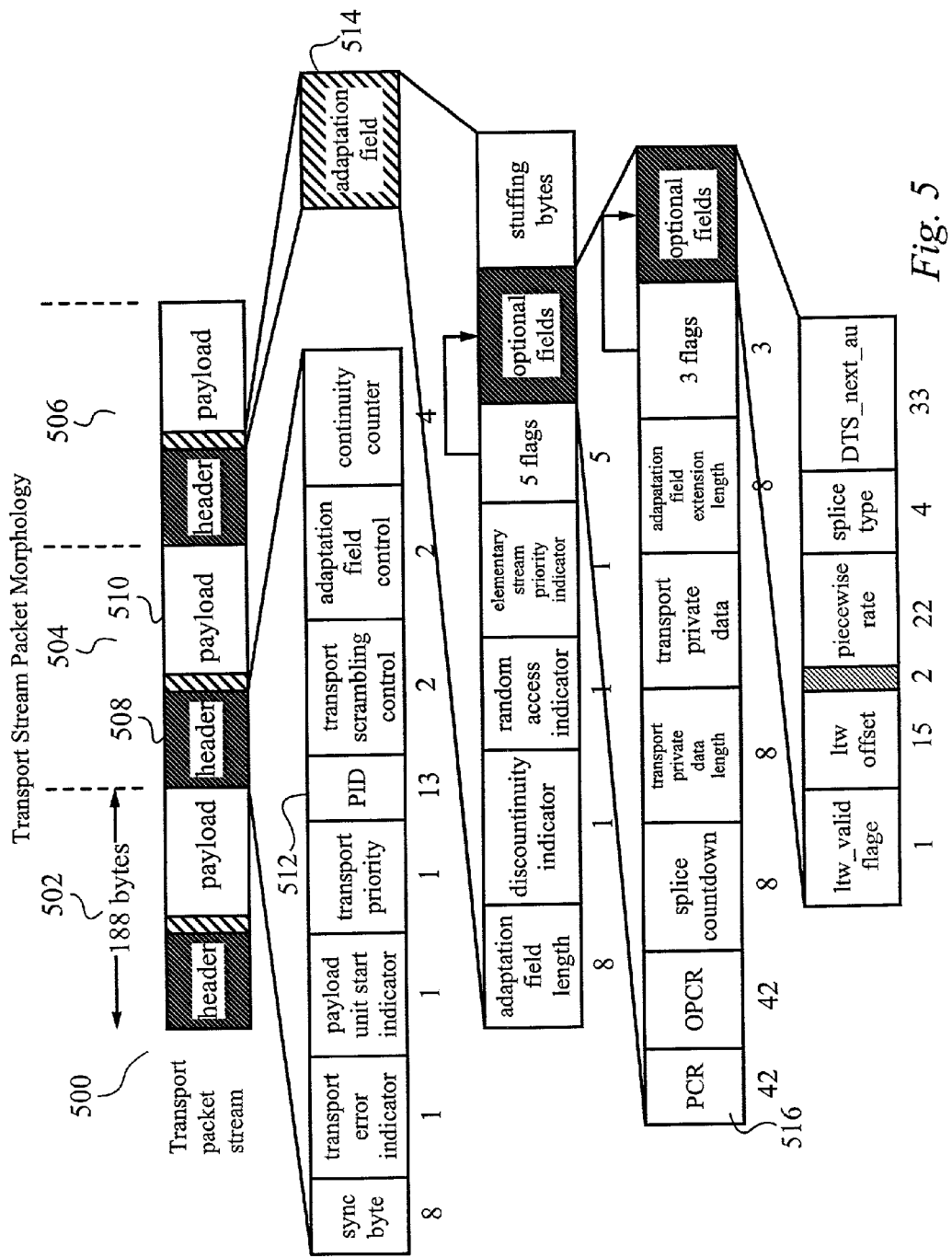
FIG. 5 illustrates the fields within a transport stream packet according to standards recommended for MPEG 2 transport stream transmission.
Figure 6:
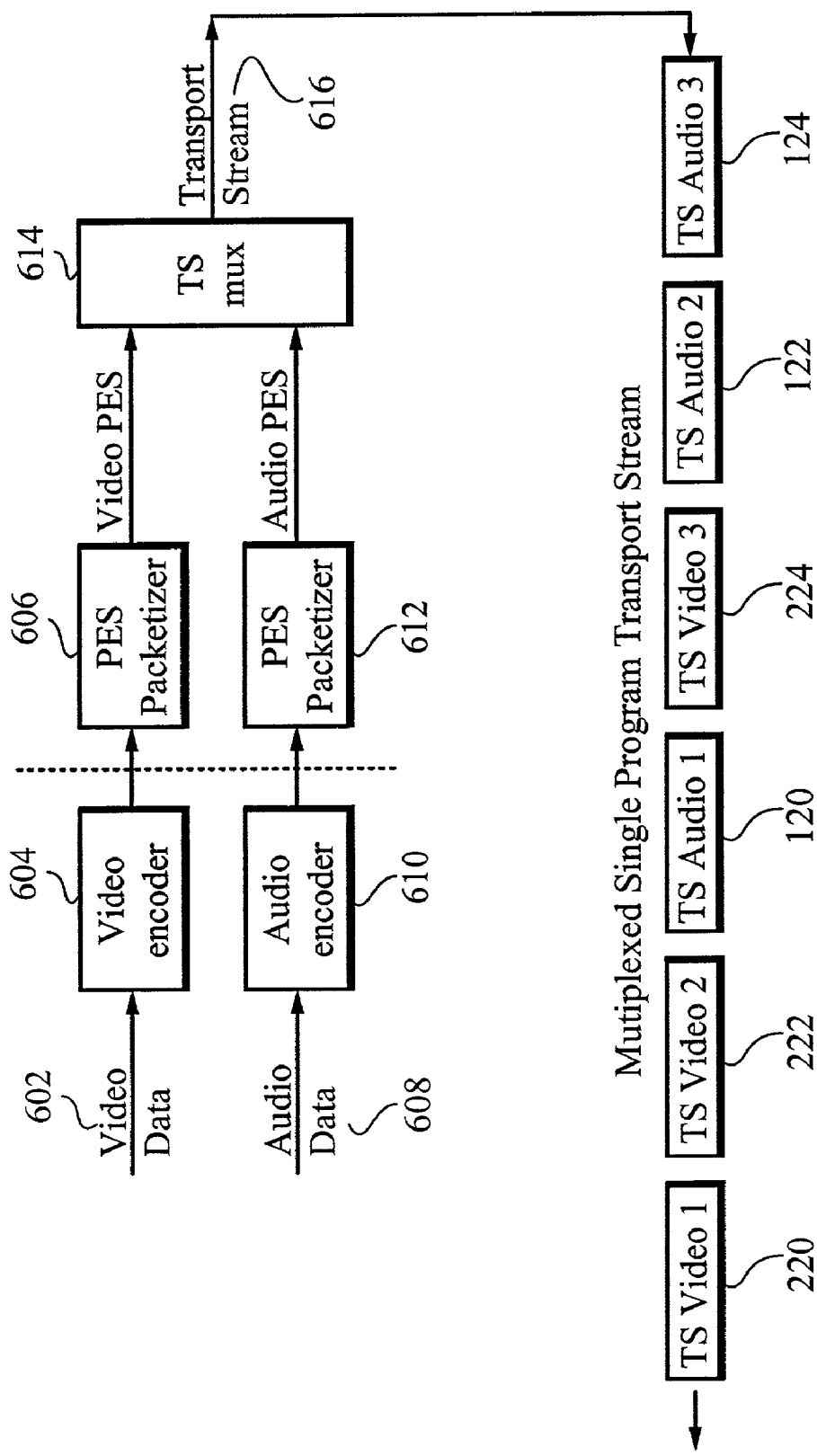
FIG. 6 shows the encoding of a single program transport stream.
Figure 7:
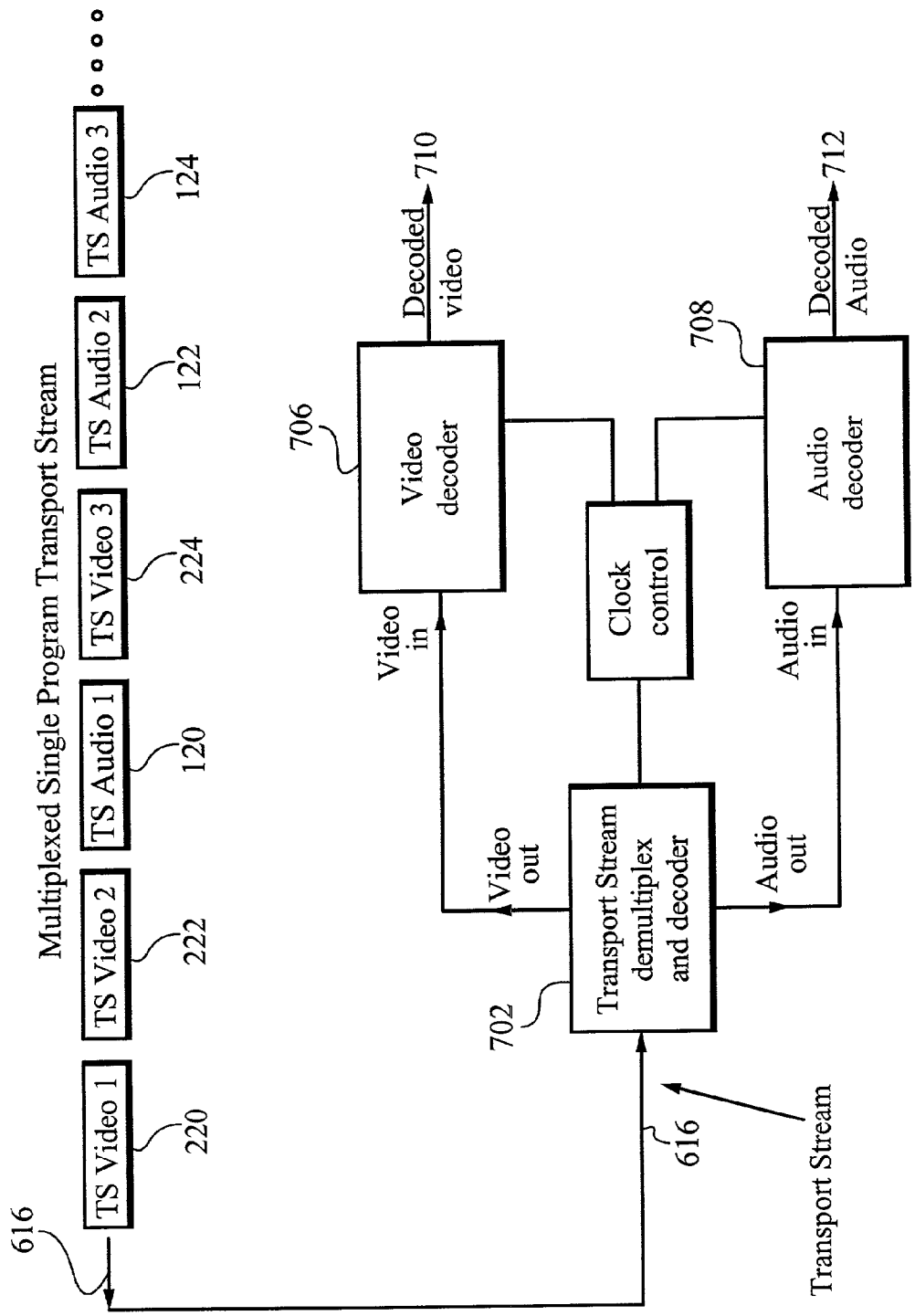
FIG. 7 shows the decoding of a single program transport stream.
Figure 8:
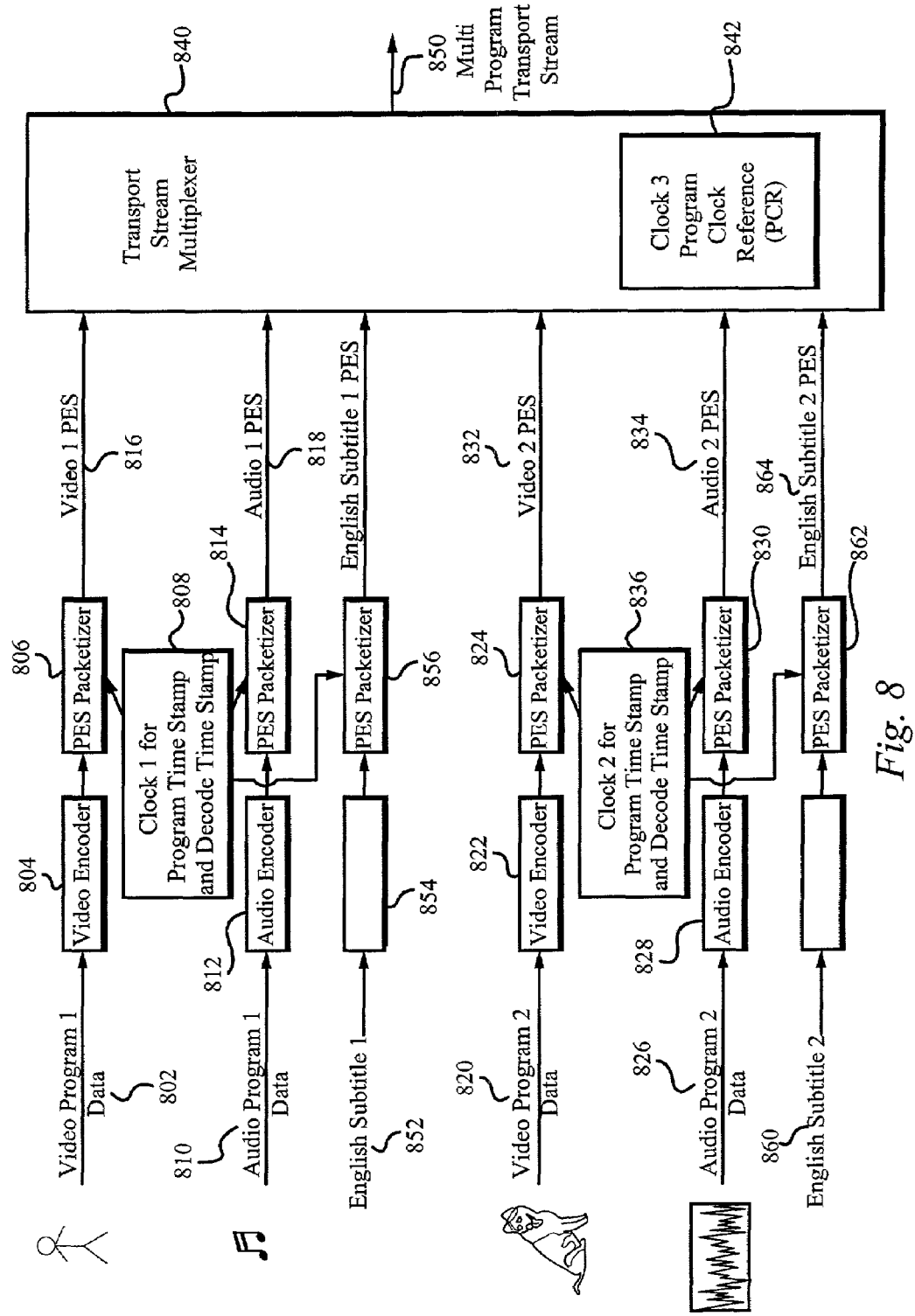
FIG. 8 shows the encoding of a multi-program transport stream.
Figure 9:
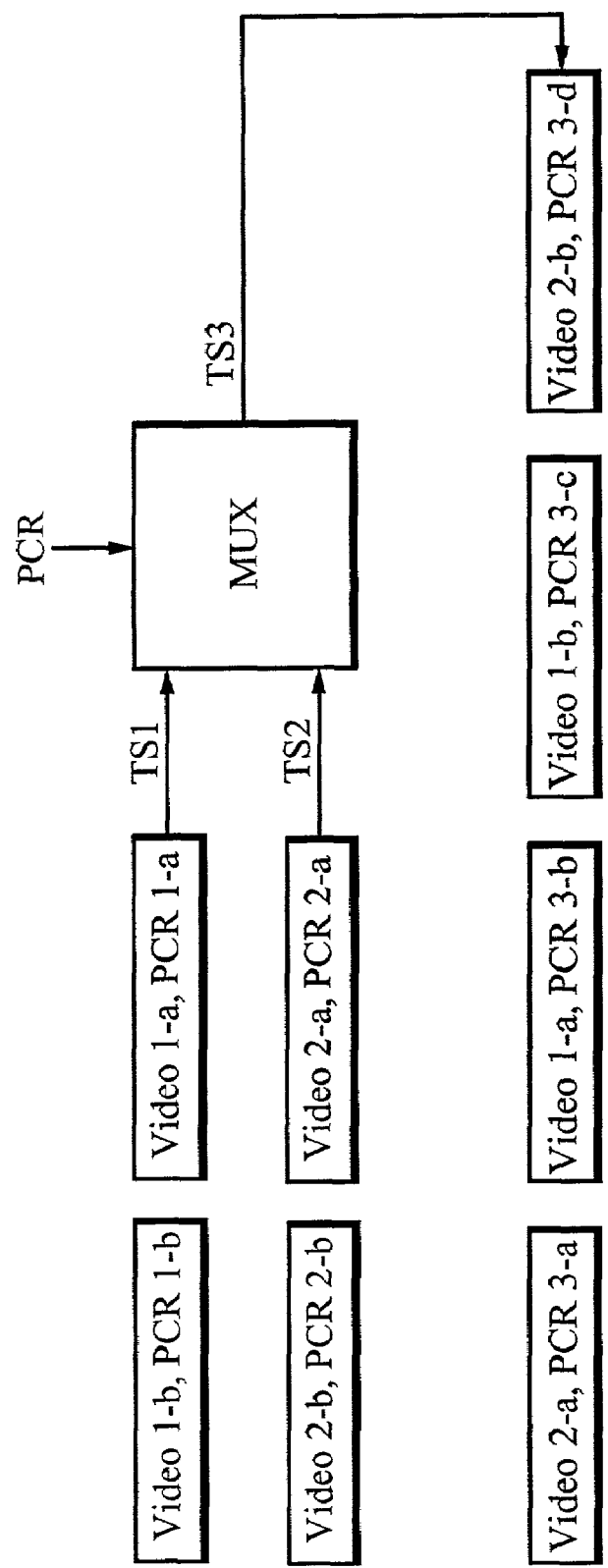
FIG. 9 illustrates the process of combining two separate transport streams into a single transport stream.
Figure 10:
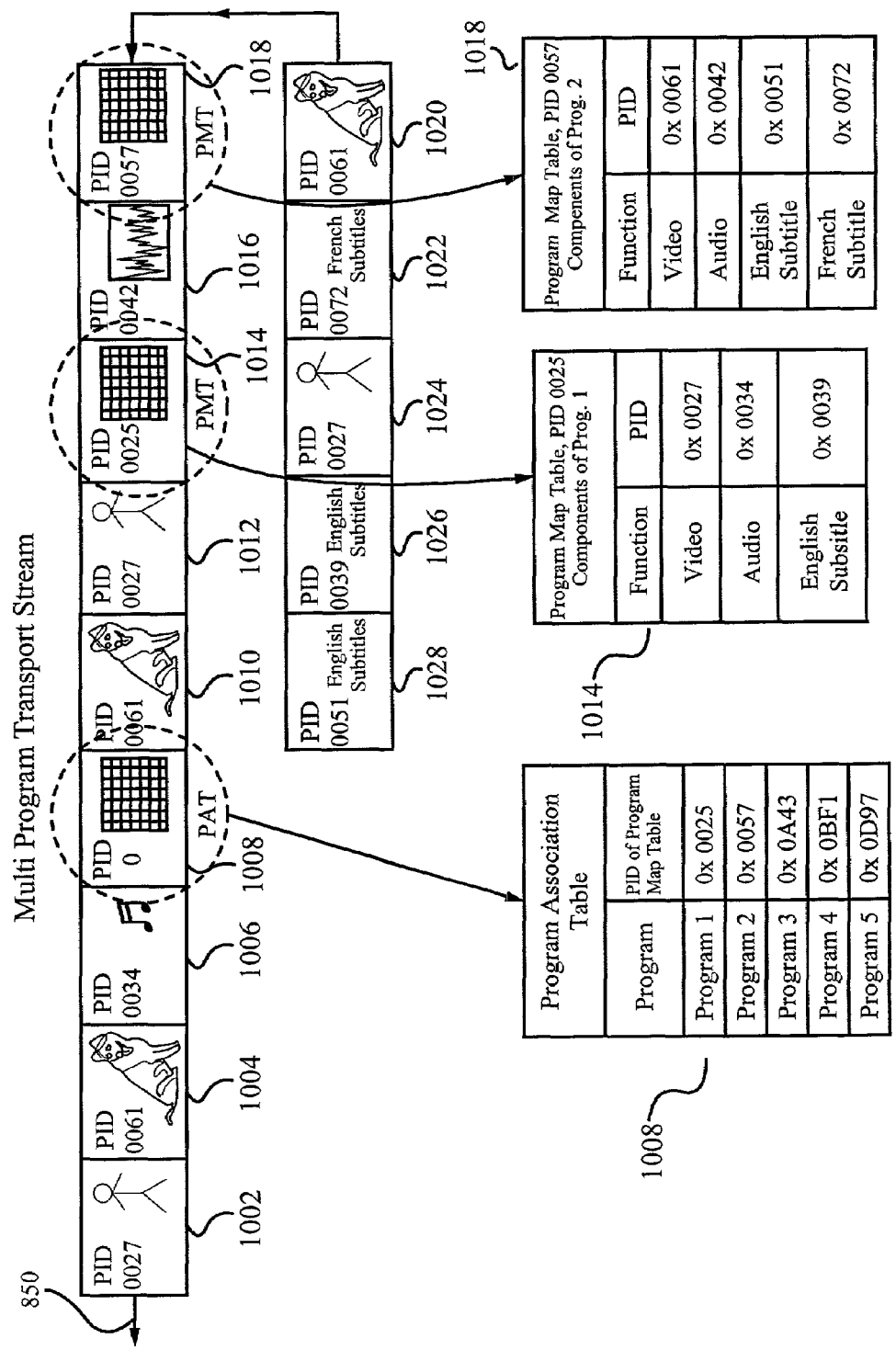
FIG. 10 shows component portions of a multi-program transport stream, including the program association table, and program map tables.
Figure 11:
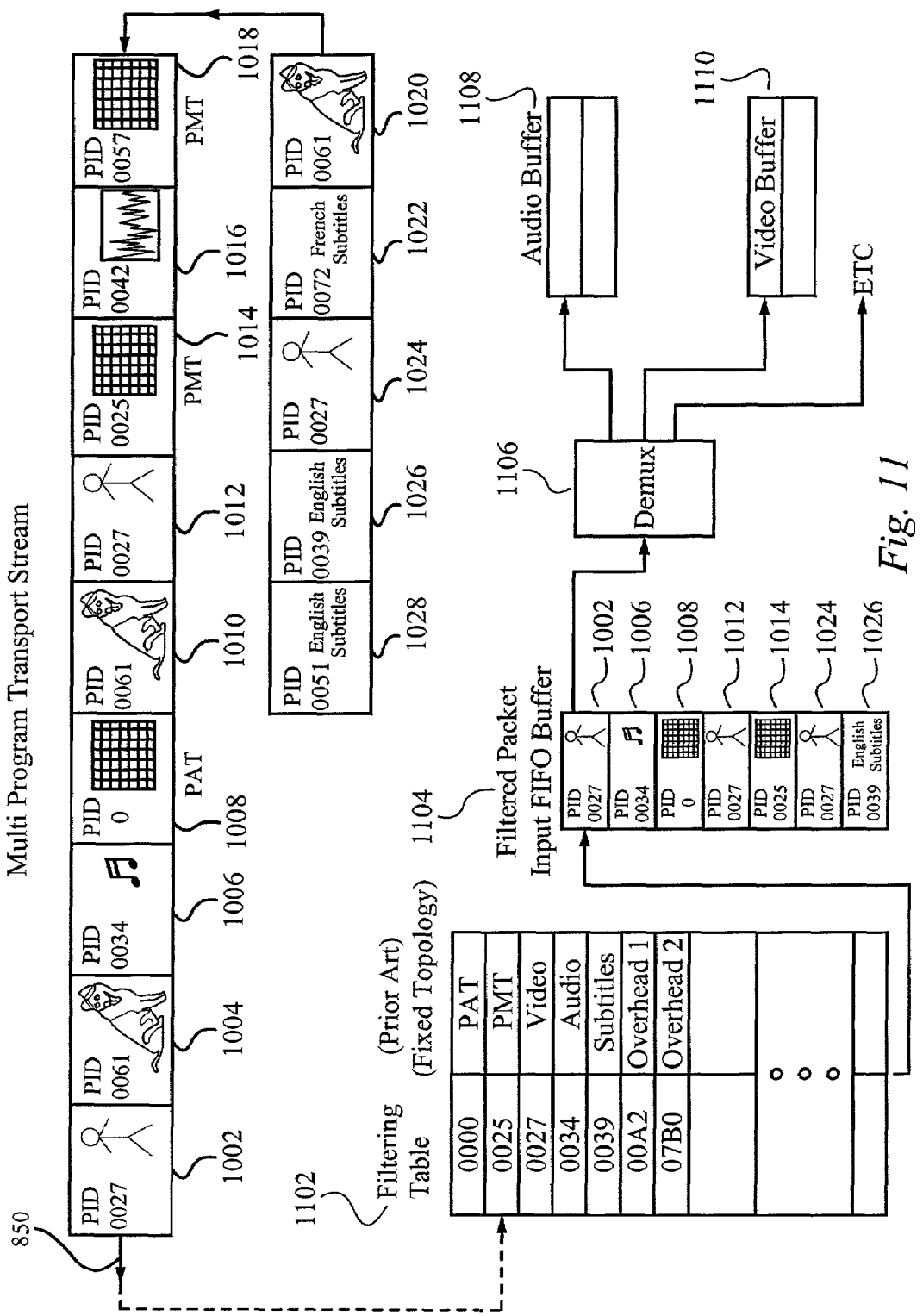
FIG. 11 shows the filtering and storage of a multi-program transport stream according to a filtering table of fixed topology found in the prior art, and stored in buffers of a fixed topology according to the prior art.
Figure 18:
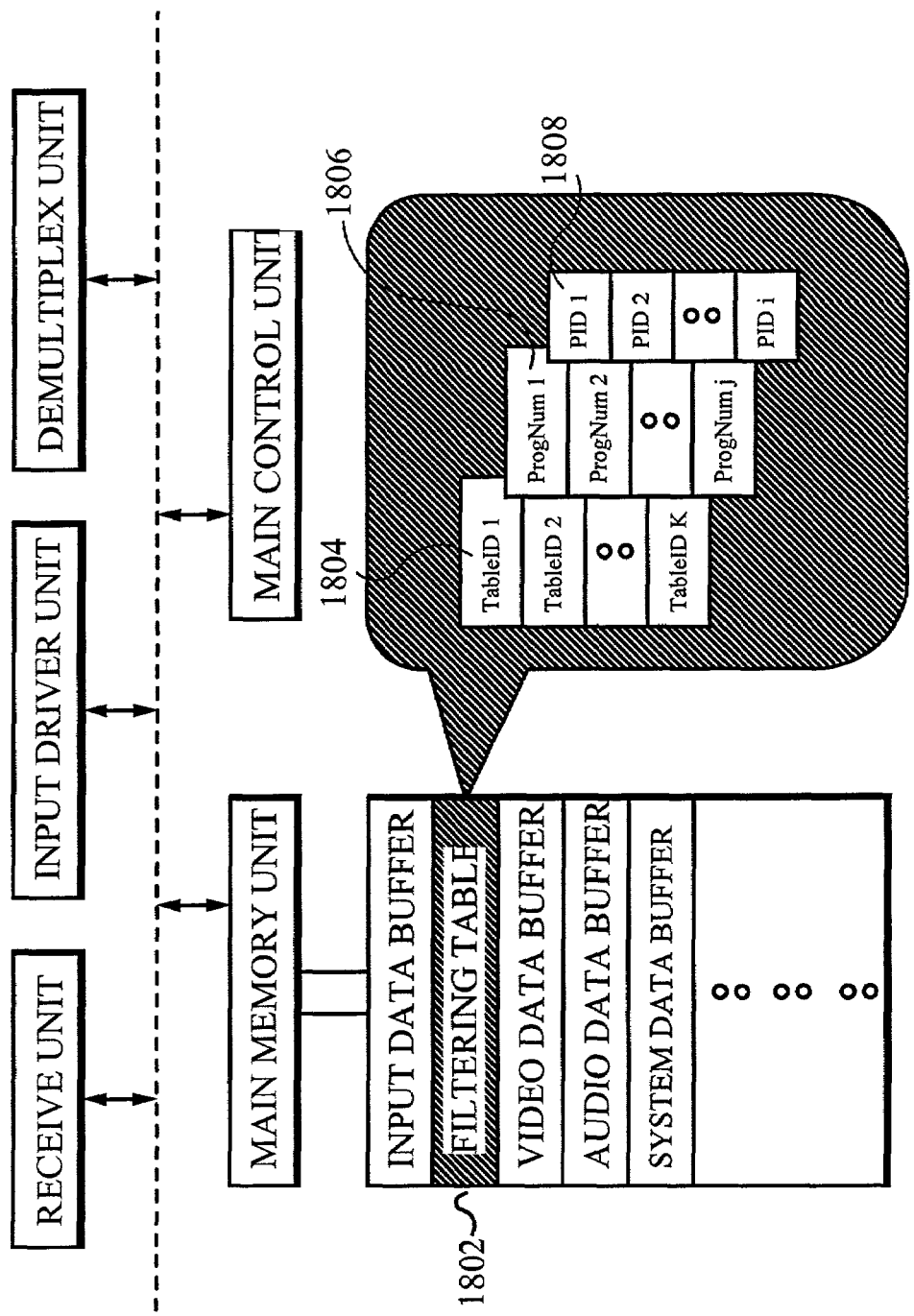
FIG. 18 illustrates various scalable parameters within a scalable filtering table.

FIG. 18 illustrates a filtering table 1802 comprising multiple columns 1804, 1806, 1808, for filtering various families of parameters including a packet identifier 1808 (see also 512, FIG. 5).

Referring now to FIG. 19, the number of registers 1902, 1904, 1906 within a particular table 1804, 1806, 1808 can be optimized (expanded or contracted) to correspond to the number of values which are to be stored in that table at any one time. Using again, for exemplary purposes only, the MPEG 2 standard and referencing specifically the PID filtering table 1808, FIG. 19A shows a scalable PID filtering table comprising a field of five registers for storing the program association table PID 1902, the program map table PID 1904 of a first program, the video PID 1906 of the first program, the audio PID of the first program 1908, and a system PID 1910. In a re-scaled embodiment, FIG. 19B shows the same PID filtering table 1808 comprising twelve registers. It should be understood, however, by those skilled in the art, that an embodiment of the present invention incorporates multiple data values for each entry. In addition to the PIDs referenced in conjunction with FIG. 19A, the table has been expanded to accommodate the PID of a second program map table 1912 representing a second program, and a variety of video 1914, audio 1916-1922 and subtitle 1924 PIDs associated with the second program. Because the PID filtering table according to FIG. 19A is required to contain only five PID values, the table is optimized to contain only five registers. Similarly, the scaled PID filtering table of FIG. 19B is required to store exactly twelve PIDs, and is therefore optimized to exactly twelve registers.

Accordingly, the PID table 1808 is scalable to accommodate varying numbers of PIDs. Those skilled in the art will understand that the same scalable process can be applied to other potential filtering tables such as illustrated in FIG. 18. Additionally, it is understood that the specific application to fields found in an MPEG 2 transport stream packet (FIG. 5) are illustrated for exemplary purposes only, and that the scalable architecture can be applied to any equivalent field in any digital packetized information stream.

Figure 20:
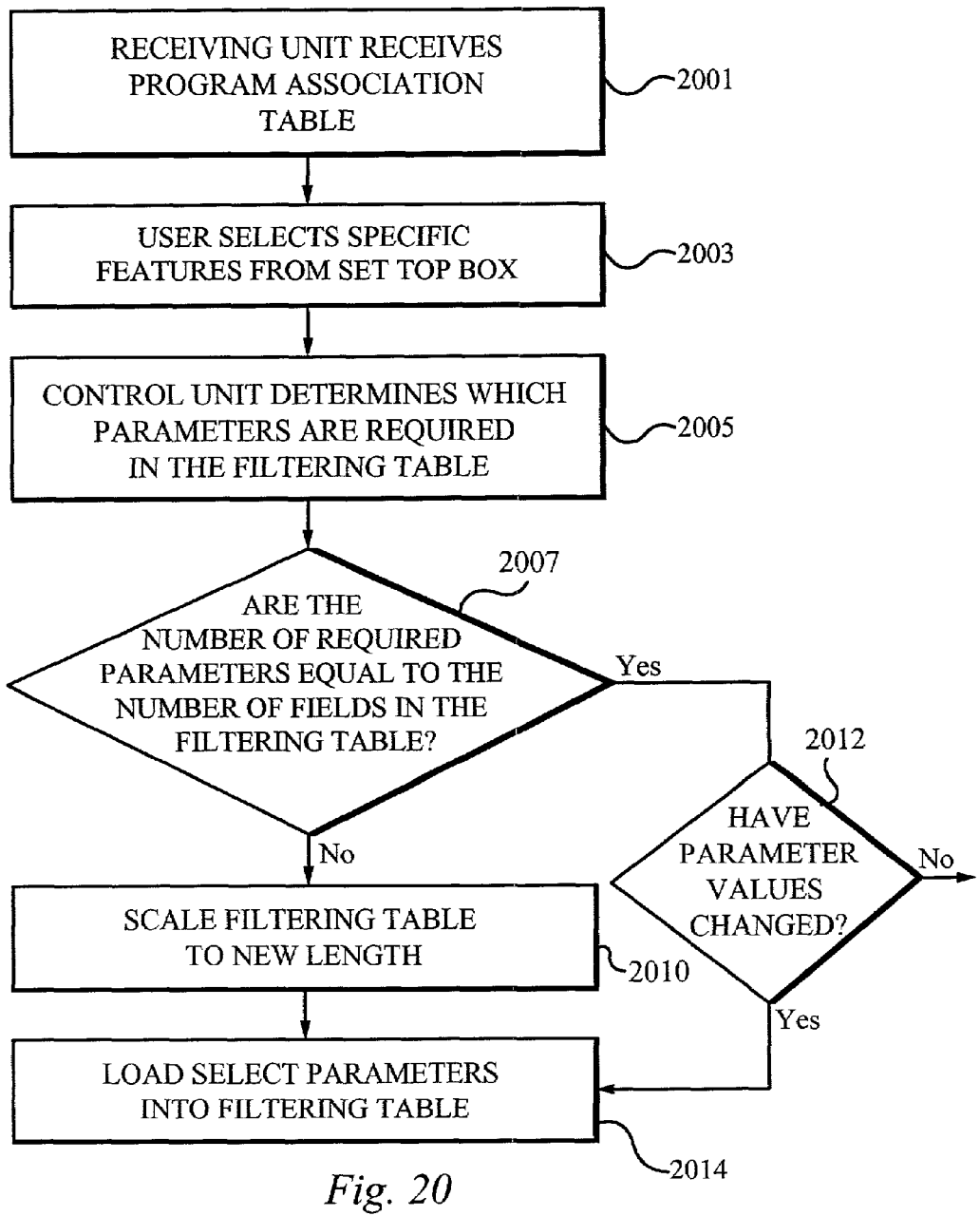
FIG. 20 is a flow chart illustrating the automatic re-scaling of a filtering table in response to user program selection.

FIG. 20 illustrates one sequence for scaling a table 1804, 1806, 1808 within a filtering table 1802 to an appropriate number of registers, as illustrated in FIG. 19. Using a PID table 1808 again for exemplary purposes only, according to the step 2001, the receiving unit 1202 receives a program association table from the transport stream defining the programs available within the transport stream. According to the step 2003, the user selects a program or programs available within the transport stream. It is envisioned that the user selection is entered through an input unit 1205 (FIG. 12). According to the step 2005, the control unit 1203 determines which parameters are required for storage within the filtering table in conjunction with the user selection. Typically, these parameters will include PID zero for the program association table, the PIDs of the program map table(s) 914, 918 correlating to the programs selected by the user, as well as any PIDs listed within those program map tables. The PID's for "system" or "overhead" data may also be automatically selected by the control unit 1203 for storage in the PID filtering table. At the step 2007, the control unit 1203 determines if the number of required PIDs are equal to the number of PID registers currently in the PID column of the filtering table. If the number of existing fields is not correct, at the step 2010, the control unit 1203 scales the filtering table to a new size, and loads select parameters into the PID column of the filtering table according to the step 2014. If, in the step 2007, there is no change between the number of fields in the PID column and the number of PID values required according to the most recent user selection, according to the step 2012, the control unit 1203 determines if the PID values have changed. If the required parameter values are different than the values presently stored in the filtering table, according to the step 2014, the old values are replaced by new values which are loaded into the filtering table.

Figure 21:
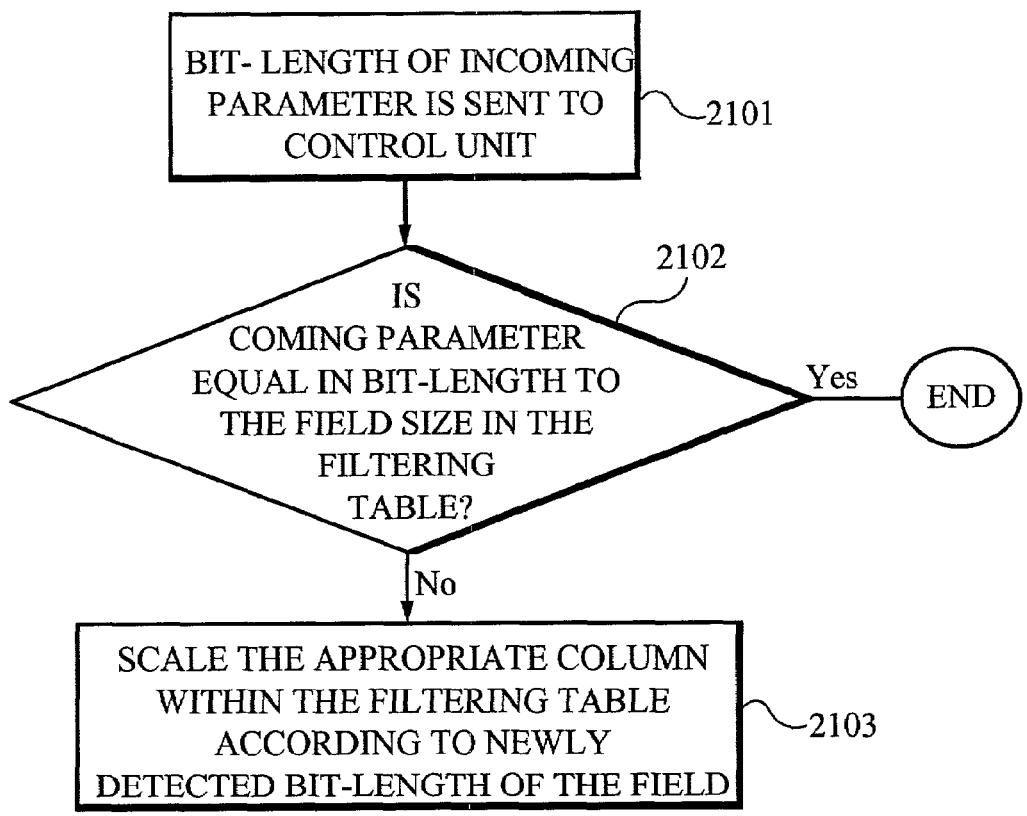
FIG. 21 is a flow chart illustrating the automatic re-scaling of the field size of a given parameter in the filtering table in response to a variation in the bit-length of the incoming parameter.

FIG. 14 illustrates a PID filtering table scaled to different size registers, one for holding PIDs of thirteen bits, the other for storing PIDs of seventeen bits. The process of scaling of a register to a different number of bits is illustrated in FIG. 21. According to the step 2101, the length of an incoming bit field for a packet identifier is sent to the control unit 1203. According to the step 2102, the control unit compares the newly received bit-length with a FIG. representing the bit length currently used to map the PID column 1808 of the filtering table 1102, 1802. According to the step 2103, if the bit field of the incoming PID is different from the existing field size in the filtering table (FIG. 14A), the control unit 1203 scales the PID table 1808 of the filtering table 1802 according to the new length of the bit-field. Although FIG. 21 demonstrates an automatic process by which a PID register could be expanded, those skilled in the art will understand that other processes, such as user input, could equally trigger the scaling of a bit-field of a packet identifier or some other parameter.

Figure 22:
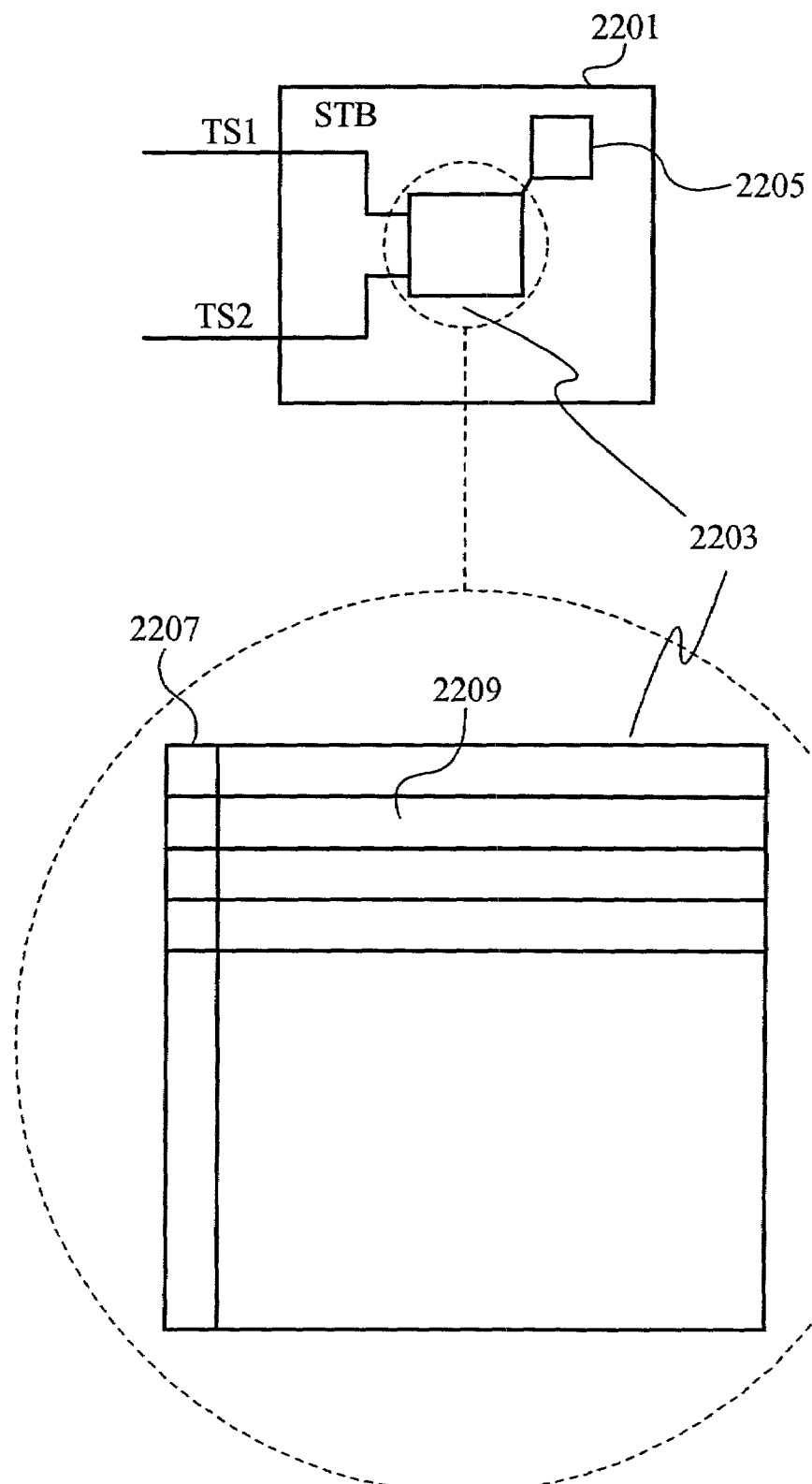
FIG. 22 illustrates a multi transport stream filtering unit and settop box.

FIG. 22 is an illustration of a settop box 2201 configured to receive transport stream data from a plurality of transport streams TS 1 and TS 2. The plurality of transport streams TS 1 and TS 2 are directed into a single filtering table 2203 coupled to a filtering engine 2205. This single filtering table 2203 is shared by the transport streams TS 1 and TS 2 and used by the filtering engine 2205 to filter both of the transport streams TS 1 and TS 2. Although the same PID cannot occur in unrelated data packets in a single transport stream, because the settop box 2201 is configured to receive data from a plurality of transport streams, the potential exists for some of the PID values in the first transport stream TS 1 to be duplicated in the second transport stream TS 2. As an example, a PID value from the first transport stream TS 1 is desired for reception by the settop box 2201, whereas the same PID value in the second transport stream TS 2 is to be rejected by the settop box 2201. If a PID value is written in the settop box according to the prior art, data packets defined by that PID value in both transport streams TS 1 and TS 2 would be received by the filtering table within the settop box. A blow-up of filtering table 2203 is illustrated in conjunction with FIG. 22. According to the present invention, the filtering table 22 is configured with PID entries 2209 and a transport stream identifier field 2207. The transport stream identifier field 2207 is configured to store a value to distinguish between a plurality of transport streams, and designate from which transport stream the packet was received. The filtering table 2203 according to this embodiment of the present invention is capable of filtering transport stream packets from a plurality of transport streams. According to the scalable features of the present invention, the filtering engine 2205 is capable of deleting the transport stream identifier field when only one transport stream TS 1 is being filtered, creating an extra column for the transport stream identifier field 2207 when more than one transport streams are filtered by the same filtering table 2207, and expanding the width of the transport stream identifier field 2207 as required to accommodate the value determined as necessary to distinguish separate transport streams. Consistent with the features of FIG. 22, as discussed, the number of PIDs or other parameters stored in the scalable filtering table 2203 of FIG. 22 may be expanded or contracted, as illustrated in conjunction with FIGS. 14-21.

The present invention provides various advantages over the fixed architecture of the prior art. A flexible memory architecture that allows a filtering table to be scaled to an optimal number of parameters without performing a hardware upgrade to the system including the filtering tables. A flexible memory architecture as disclosed in the present invention also allows a filtering table to be scaled to accommodate variable bit lengths of PIDs or other packet parameters as standards are upgraded or changed. The flexible memory architecture of the present invention further allows a FIFO input buffer and various filtered-data buffers to be scaled to an optimal size in response to changing bit rates of an incoming digital stream. Additionally, the flexible memory architecture of the present invention allows the creation of an optimal number of filtered-data buffers for storing different types of de-multiplexed data in response to changing character of a data transport stream or changing specifications within the filtering table.

The present invention has been described in terms of specific embodiments incorporating many specific details offered to facilitate an understanding of the principles of construction and operation of the invention. The reference herein to specific embodiments and details thereof are not intended to limit the scope of the claims appended hereto. It will be apparent to those skilled in the art that modifications may be made to the embodiments chosen for illustration without departing from the spirit and scope of the invention.

What is claimed:

1. A broadcast receiver for processing digital data from a multiplexed digital transport stream, the transport stream comprising a plurality of transport packets, wherein each transport packet is defined by a parameter identifier, the broadcast receiver comprising:
    a. a receiving unit for receiving the multiplexed transport stream;
    b. a memory area coupled to the receiving unit for storing incoming digital data;
    c. a scalable filtering table coupled to the receiving unit for identifying at least one parameter identifier among a potential plurality of parameter identifiers within the multiplexed transport stream data, the scalable filtering table comprising a number of logical entries, each logical entry having a defined bit length, and each logical entry for storing a parameter identifier value corresponding to a select parameter identifier, wherein the filtering table allows a transport packet including a parameter identifier having a corresponding parameter identifier value stored within the filtering table to be stored in the memory area of the broadcast receiver; and
    d. a controller coupled to the scalable filtering table, the controller configured to vary the number of logical entries within the scalable filtering table, thereby scaling a memory size of the scalable filtering table to optimally store a select number of distinct parameter identifier values corresponding to select parameter identifiers.

2. The broadcast receiver of claim 1 wherein the parameter identifier is a packet identifier in an MPEG 2 digital transport stream.

3. The broadcast receiver of claim 2 wherein the controller is configured to generate a parameter identifier value according to a packet identifier present within a transport packet within the transport stream, and wherein the controller is further configured to store the parameter identifier value within a logical entry of the scalable filtering table.

4. The broadcast receiver according to claim 3 wherein the controller is further capable of scaling the bit length of each logical entry according to a select bit length.

5. The broadcast receiver according to claim 4 wherein the bit length of each logical entry is identical.

6. The broadcast receiver according to claim 4 wherein the select bit length of a logical entry within the filtering table is determined by the controller by measuring a maximum bit length of the packet identifiers within the multiplexed transport stream.

7. The broadcast receiver according to claim 1 wherein the scalable filtering table is comprised of an erasable medium capable of storing digital information.

8. The broadcast receiver according to claim 1 further comprising a scalable input buffer for receiving input data from the multiplexed transport input stream, wherein the input buffer is scaled by the controller according to a bit rate of the multiplexed transport input stream.

9. The broadcast receiver according to claim 8 further comprising a demultiplex unit coupled with the scalable input buffer for demultiplexing data into a plurality of data types.

10. The broadcast receiver according to claim 9 further comprising a plurality of demultiplexed-data buffers for storing demultiplexed data according to the respective plurality of data types.

11. The broadcast receiver according th claim 10 wherein each of the plurality of demultiplexed-data buffers are respectively used for storing a homogeneous data type selected from a group including video data, audio data and system data.

12. The broadcast receiver according to claim 1 wherein the broadcast receiver is configured to receive transport packets from a plurality of transport streams, the scalable filtering table further comprising a transport stream column, wherein the controller is configured to store values in the transport stream column to distinguish the transport streams.

13. The broadcast receiver according to claim 12 wherein the transport stream column is scalable.

14. A broadcast receiver for receiving digital data from one or more multiplexed transport streams, each of the transport streams comprising a plurality of transport packets, wherein each transport packet is defined by a parameter identifier, the broadcast receiver comprising:
    a. a receiving unit for receiving the multiplexed transport stream;
    b. a memory area for storing incoming digital data;
    c. a scalable filtering table for identifying at least one parameter identifier among a potential plurality of parameter identifiers within the multiplexed transport stream data, the scalable filtering table comprising a variable number of logical entries, each logical entry having a defined bit length, and each logical entry for storing a parameter identifier value corresponding to a select parameter identifier, wherein the filtering table is configured to allow a transport packet including a parameter identifier having a corresponding parameter identifier value stored within the filtering table to be stored in the memory area of the broadcast receiver, wherein a bit length of the first logical entry is scalable to a select bit length; and
    d. a controller for scaling the bit length of each logical entry and to vary the number of logical entries within the scalable filtering table.

15. The broadcast receiver according to claim 14 wherein the parameter identifier identifies the transport stream from among the one or more multiplexed transport streams.

16. The broadcast receiver of claim 14 wherein the plurality of parameter identifiers includes a packet identifier in an MPEG 2 digital transport stream.

17. The broadcast receiver of claim 16 wherein the controller is configured to generate a parameter identifier value according to a packet identifier present within a transport packet within the transport stream, and wherein the controller is further configured to store the parameter identifier value within a logical entry of the scalable filtering table.

18. The broadcast receiver according to claim 17 wherein the number of logical entries is sufficient to store a plurality of parameter identifier values corresponding to a respective plurality of packet identifiers.

19. The broadcast receiver according to claim 18 wherein the bit length of each logical entry is identical.

20. The broadcast receiver according to claim 18 wherein the controller scales the bit length of the first logical entry according to a maximum bit length of a packet identifier within the multiplexed transport stream.

21. The broadcast receiver according to claim 14 wherein the scalable filtering table is comprised of an erasable medium capable of storing digital information.

22. The broadcast receiver according to claim 14 further comprising a scalable input buffer for receiving input data from the multiplexed transport input stream, wherein the input buffer in scaled by the controller according to a bit rate of the multiplexed transport input stream.

23. The broadcast receiver according to claim 22 further comprising a demultiplex unit coupled with the scalable input buffer for demultiplexing data stored in the scalable input buffer.

24. The broadcast receiver according to claim 23 further comprising a plurality of scalable demultiplexed-data buffers for storing a respective plurality of demultiplexed data types.

25. The broadcast receiver according th claim 24 wherein a demultiplexed-data buffer is used for storing a homogeneous data type selected from a group of data types including video data, audio data and system data.

26. The broadcast receiver according to claim 14 wherein the broadcast receiver is configured to receive transport packets from a plurality of transport streams, the scalable filtering table further comprising a transport stream column, wherein the controller is configured to store values in the transport stream column to distinguish the transport streams.

27. The broadcast receiver according to claim 26 wherein the transport stream column is scalable.

28. A broadcast receiver for receiving digital data from a multiplexed transport stream, the transport stream comprising a plurality of transport packets, wherein each transport packet is defined by a parameter identifier, the broadcast receiver comprising:
  a. a receiving unit for receiving the multiplexed transport stream;
  b. a filtering table for identifying at least one parameter identifier among a potential plurality of parameter identifiers within the multiplexed transport stream, the filtering table comprising a variable number of logical entries, each logical entry having a defined bit length, and each logical entry configured to store a parameter identifier value corresponding to a select parameter identifier;
  c. a scalable input buffer for receiving input data from the multiplexed transport input stream; and
  d. a controller for scaling the scalable input buffer and to vary the number of logical entries in the filtering table.

29. The broadcast receiver of claim 28 wherein the controller scales the scalable input buffer according to a bit rate of the multiplexed transport input stream.

30. A system comprising:
  a. a digital broadcast apparatus for broadcasting a multiplexed transport stream of digital data, the transport stream comprising a plurality of packets, wherein each transport packet is defined by a packet identifier;
  b. a receiving unit coupled with the digital broadcast apparatus by means of a transport channel, the receiving unit configured to receive the multiplexed transport stream of digital data;
  c. a memory area coupled with the receiving unit for storing digital data received by the receiving unit;
  d. a scalable filtering table for identifying at least one packet identifier among a potential plurality of packet identifiers within the multiplexed transport stream, the scalable filtering table comprising a scalable plurality of logical entries for storing a plurality of packet identifier values, each logical entry having a defined bit length, and the packet identifier values are selected to correspond to select packet identifiers within the transport stream, wherein the filtering table allows a transport packet defined by a packet identifier having a corresponding packet identifier value stored within the filtering table to be received from the transport stream and stored in the memory area;
  e. a controller configured to vary the number of logical entries within the scalable filtering table; and
  f. a presentation means coupled with the memory area for presenting to a user a sensible manifestation of data received in the memory area from the transport stream.

31. The system according to claim 30 wherein the presentation means is selected from among an audio system for presenting audio information to the user's the hearing senses and a video system for displaying video information to the user's visual senses.

32. A method of scaling a filtering table within a broadcast receiver, the filtering table comprising a first column in an erasable digital medium, wherein the scalable filtering table is used to assist in selectively filtering select data packets from a multiplexed transport stream of digital data comprising a plurality of data packets, wherein the data packets within the transport stream are each defined by a value within a first parameter field, the method comprising:
  a. identifying a first select set of values among the first parameter field within the transport stream;
  b. generating a first set of digital filtering values corresponding to the first select set of values among the first parameter field;
  c. mapping the first column of the filtering table to generate a first set of digital filtering fields, each digital filtering field of the first set having a first field size, the first set of digital filtering fields being sufficient in quantity to hold the first set of digital filtering values;
  d. storing the first set of digital filtering values within the respective digital filtering fields within the first column;
  e. determining a quantity of distinct parameter types to be examined by the filtering table; and
  f. scaling the filtering table to include a number of columns at least equal to the quantity of distinct parameter types to be examined by the filtering table.

33. The method according to claim 32 wherein the parameter identifiers are packet identifiers within an MPEG 2 transport stream.

34. The method according to claim 32 further comprising:
  a. determining the first field size necessary for storing a first select digital filtering value from among the first set of digital filtering values; and
  b. mapping a first digital field within the first column such that the first digital field is large enough to store the first select digital filtering value.

35. The method according to claim 32 wherein the scalable filtering table further comprises a second column in an erasable digital medium, the second column for storing a second set of filtering values corresponding to a select second set of values within a second parameter field within the transport stream, the method further comprising:
  a. identifying a second select set of values among the second parameter field within the transport stream;
  b. generating a second set of digital filtering values corresponding to the second select set of values among the second parameter field;
  c. mapping the second column of the filtering table to create a second set of digital filtering fields, the second set of digital filtering fields being sufficient in quantity to hold the second set of digital filtering values; and d. storing the second set of digital filtering values within the respective digital filtering fields within the second column.

36. The method according to claim 32 further comprising:
b. determining a field size necessary for storing a second digital filtering value from among the second set of digital filtering values; and
c. mapping a second digital field within the second column such that the second digital field is large enough to store the second filtering value.

37. The method according to claim 32 further comprising:
a. determining a first optimal buffer size for an input buffer in an erasable digital medium, the input buffer being used for storing data from the multiplexed transport stream of digital data, the first optimal buffer size being determined according to a bit rate of the transport stream of digital data;
b. mapping the input buffer according to the determination of the first optimal buffer size; and
c. storing input data from the transport stream of digital data into the input buffer.

38. The method according to claim 32 further comprising demultiplexing the input data stored in the input buffer into a plurality of data types including a first data type and a second data type.

39. The method according to claim 38 further comprising:
a. determining a second optimal buffer size for a first demultiplexed-data buffer in an erasable digital medium, the first demultiplexed-data buffer to be used for storing demultiplexed data of the first data type;
b. mapping the first demultiplexed-data buffer according to the determination of the second optimal buffer size; and
c. storing data of the first data type in the first demultiplexed-data buffer.

* * * * *

UNITED STATES PATENT AND TRADEMARK OFFICE
CERTIFICATE OF CORRECTION

PATENT NO. : 7,647,619 B2
APPLICATION NO. : 09/935419
DATED : January 12, 2010
INVENTOR(S) : Koji Kashima It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1975 days.

Signed and Sealed this

Sixteenth Day of November, 2010

David J. Kappos
*Director of the United States Patent and Trademark Office*